United States Patent [19]

Thompson

[11] 4,222,068
[45] Sep. 9, 1980

[54] SUBSCRIPTION TELEVISION APPARATUS AND METHODS

[75] Inventor: John R. Thompson, Los Angeles, Calif.

[73] Assignee: American Television and Communications Corporation, Englewood, Colo.

[21] Appl. No.: 957,176

[22] Filed: Nov. 2, 1978

[51] Int. Cl.³ .................. H04N 7/16; H04K 1/04
[52] U.S. Cl. .......................... 358/120; 358/124
[58] Field of Search .......................... 358/120, 124

[56] References Cited

U.S. PATENT DOCUMENTS

| 2,612,552 | 9/1952 | Crotty et al. |
| 2,619,530 | 11/1952 | Roschke |
| 2,705,740 | 4/1955 | Druz |
| 2,755,332 | 7/1956 | Druz |
| 2,755,333 | 7/1956 | Druz |
| 2,769,025 | 10/1956 | Hoffmann et al. |
| 2,907,816 | 10/1959 | Weiss |
| 2,929,865 | 3/1960 | Van Jepond |
| 2,961,481 | 11/1960 | Hammond, Jr. et al. |
| 2,972,009 | 2/1961 | Roschke |
| 3,069,492 | 12/1962 | D'Agostini |
| 3,078,337 | 2/1963 | Shanahan et al. |
| 3,081,376 | 3/1963 | Loughlin et al. |
| 3,081,377 | 3/1963 | Watters |
| 3,147,061 | 9/1964 | Walker, Jr. et al. |
| 3,184,537 | 5/1965 | Court et al. |
| 3,242,258 | 3/1966 | Salit et al. |
| 3,313,880 | 4/1967 | Bass |
| 3,439,113 | 4/1967 | Walker |
| 3,460,161 | 8/1969 | Waller et al. |
| 3,527,877 | 9/1970 | Walker |
| 3,530,232 | 9/1970 | Reiter et al. |
| 3,684,823 | 8/1972 | McVoy |
| 3,716,654 | 2/1973 | Hendrickson et al. |
| 3,777,053 | 12/1973 | Wittig et al. |
| 3,789,131 | 1/1974 | Harney |
| 3,801,732 | 4/1974 | Reeves |
| 3,813,482 | 5/1974 | Blonder |
| 3,824,332 | 7/1974 | Horowitz |
| 3,919,462 | 11/1975 | Hartung et al. |
| 4,022,972 | 5/1977 | Pires |
| 4,068,264 | 1/1978 | Pires |
| 4,081,832 | 3/1978 | Sherman |

FOREIGN PATENT DOCUMENTS 1188200 4/1970 United Kingdom .

Primary Examiner—S. C. Buczinski
Attorney, Agent, or Firm—Finnegan, Henderson, Farabow, Garrett and Dunner

[57] ABSTRACT

Subscription apparatus and methods wherein an encoder begins inversion of a video signal during the last horizontal trace line of a randomly selected vertical interval and continues to invert trace lines in the following field of the video signal. The encoder also suppresses the amplitude of randomly selected horizontal blanking pulses only during fields of the video signal while maintaining unaltered the absolute amplitude differential between the horizontal blanking pulses and associated horizontal synchronization pulses. A decoder reinverts trace lines of the field following detection of an inverted last horizontal trace line of a vertical interval. The decoder also selectively rebiases the video signal to restore the horizontal blanking pulses upon detection of a suppressed amplitude during the front porch of a horizontal blanking pulse. Reinversion of the trace lines and rebiasing of the blanking pulses is achieved by selective reference biasing of a video modulator circuit in the decoder.

18 Claims, 15 Drawing Figures

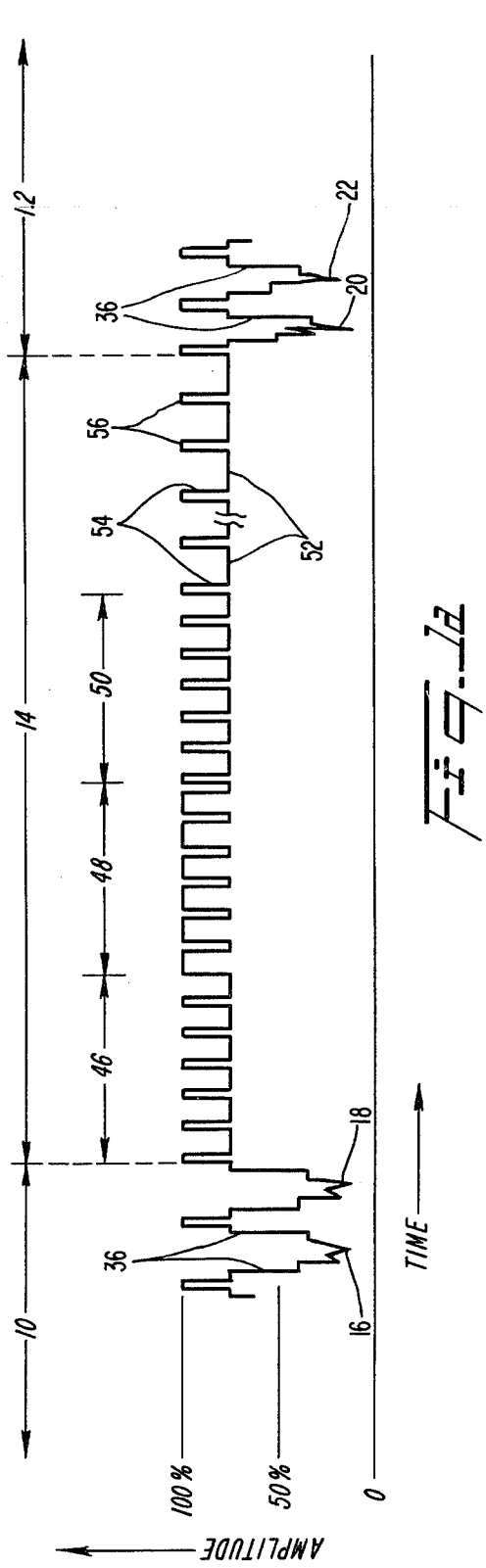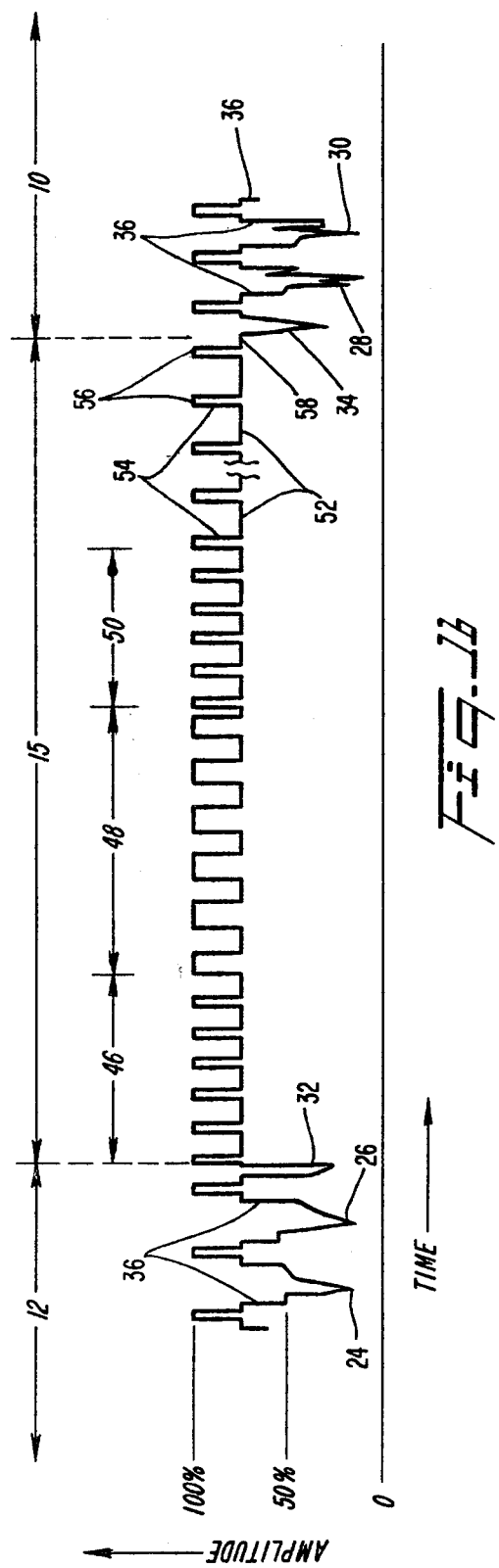

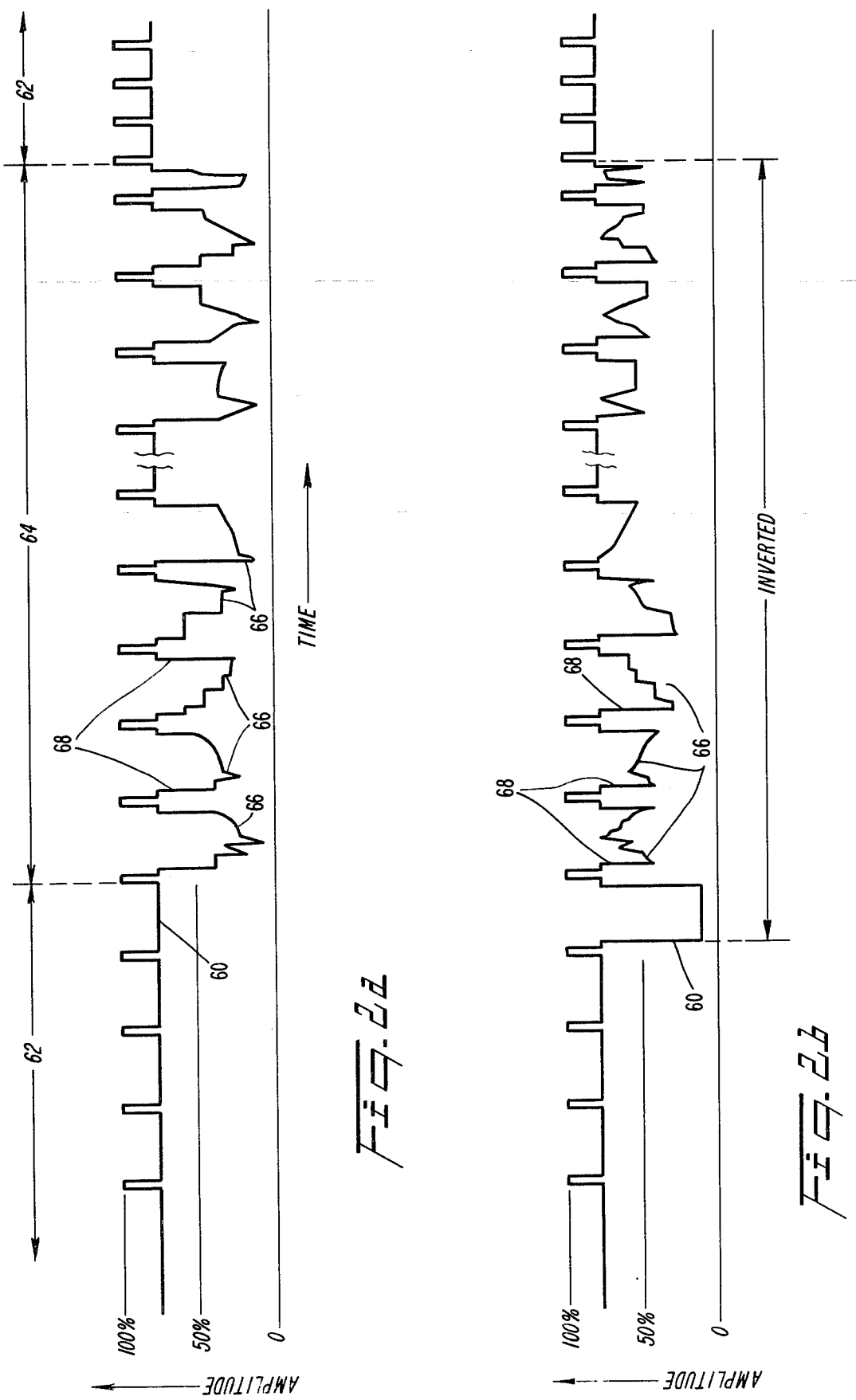

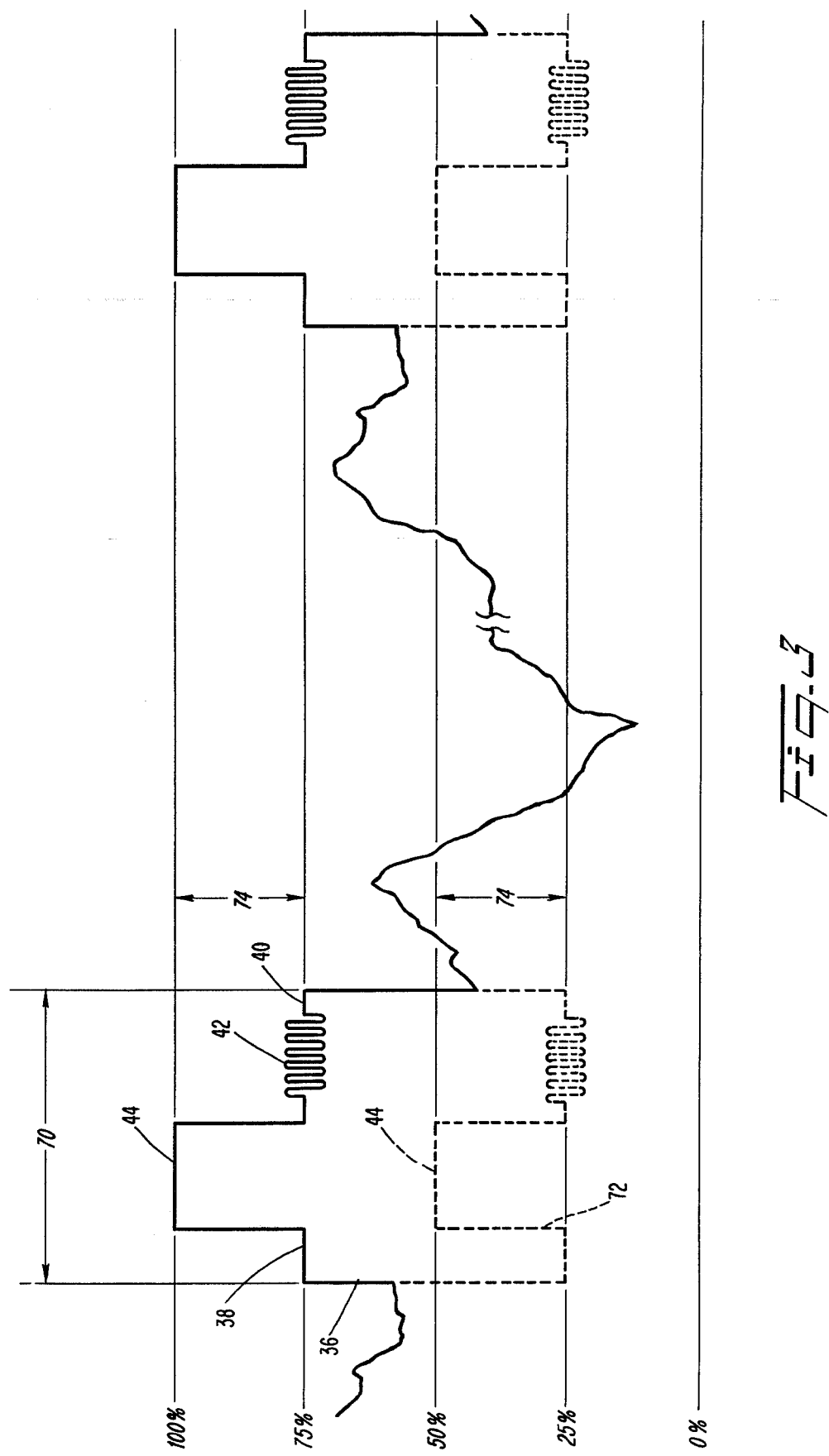

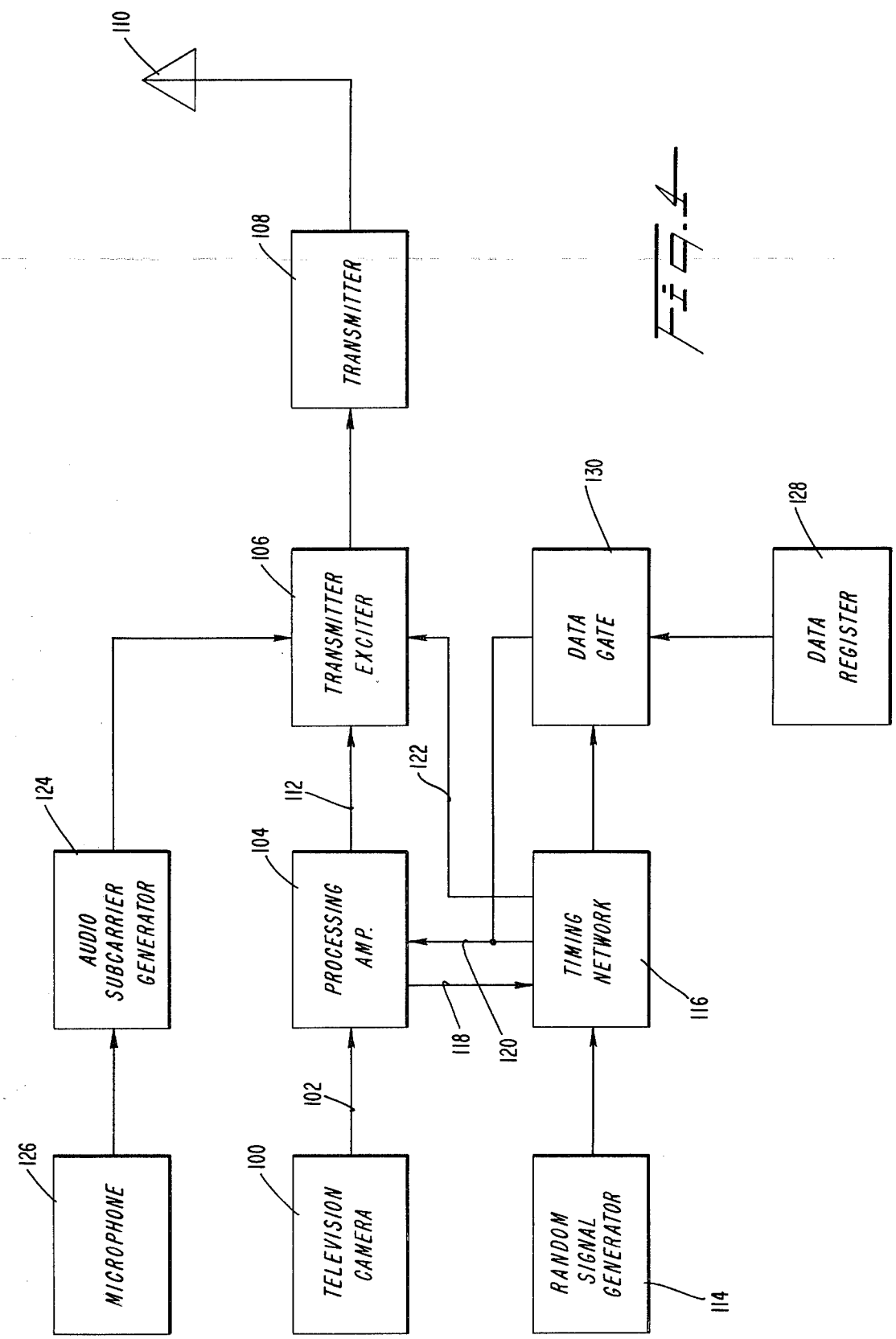

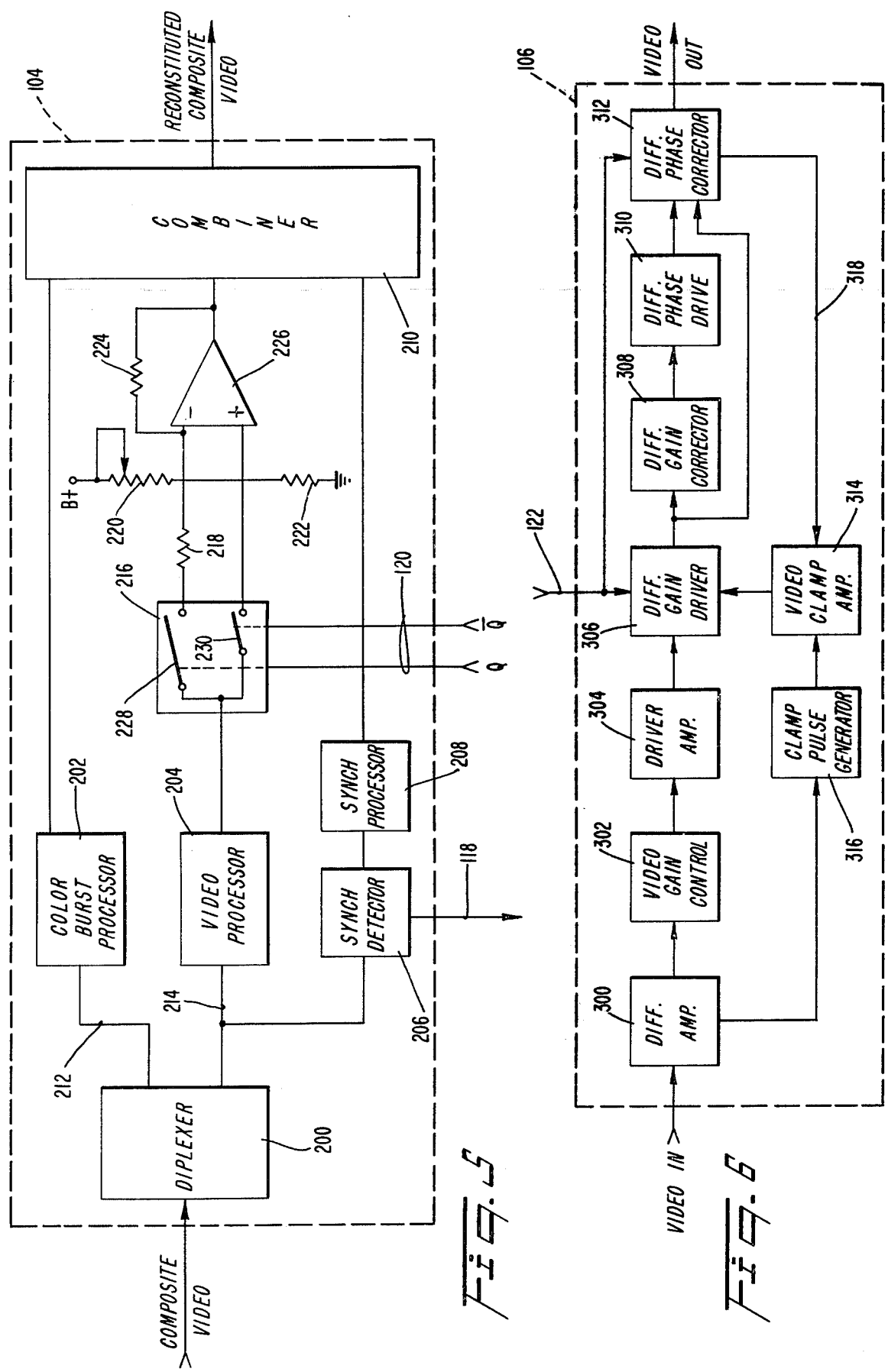

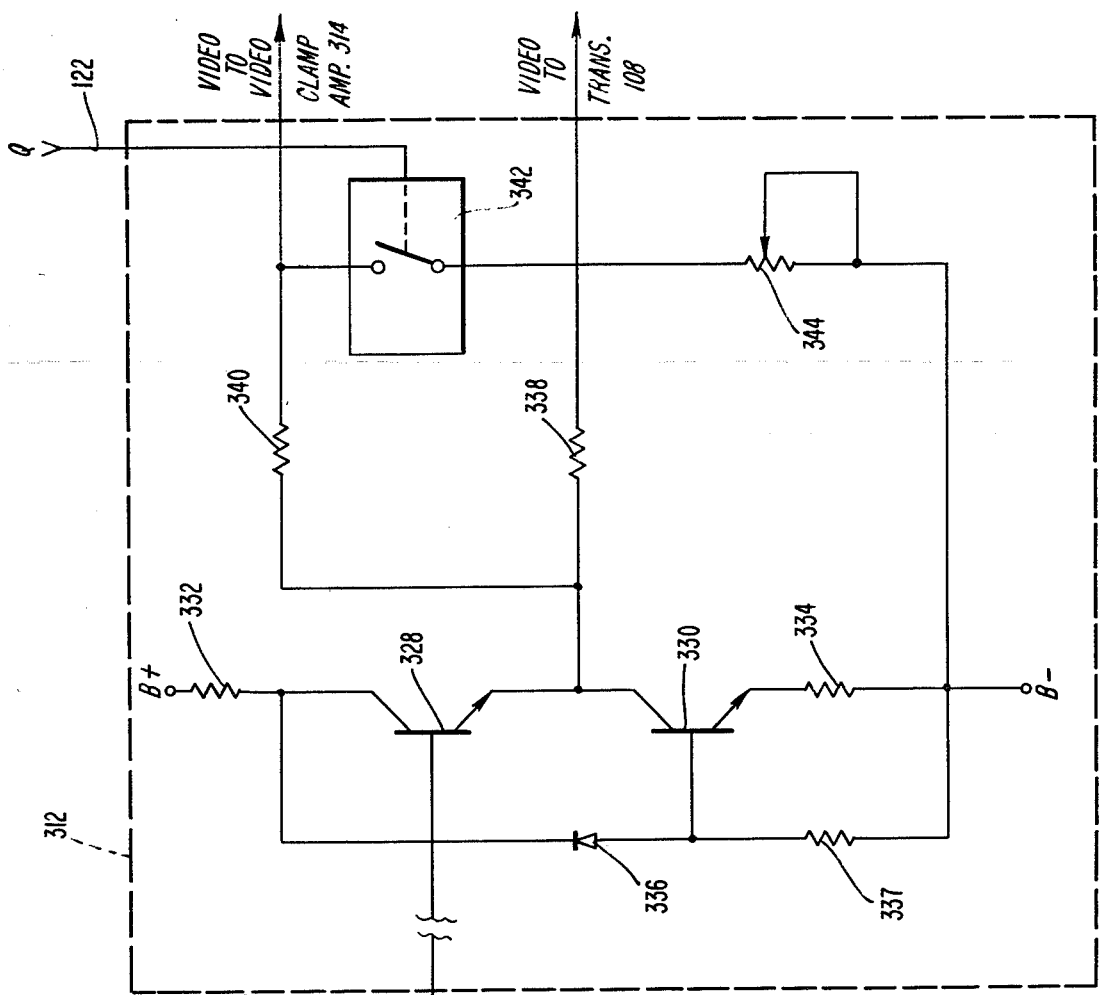
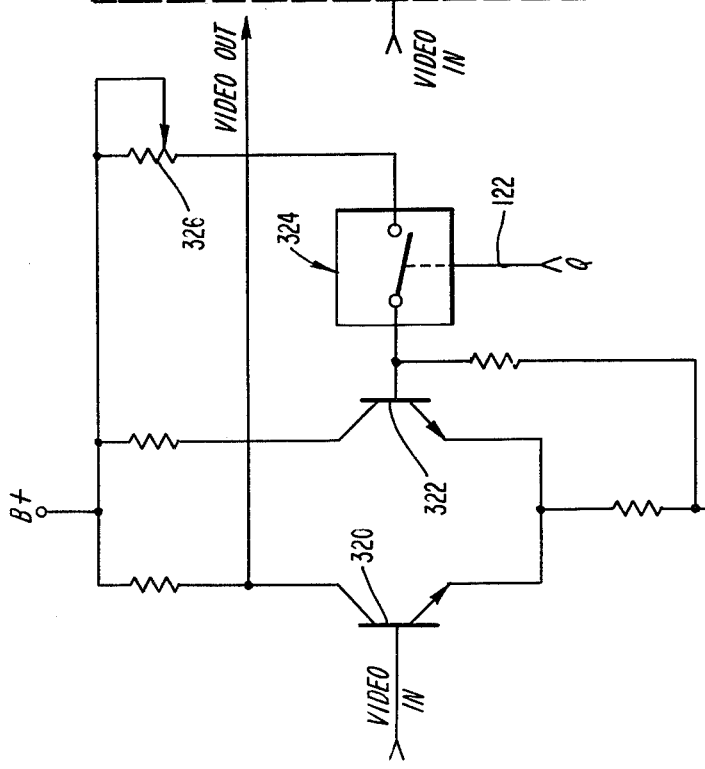
Fig. 8
Fig. 7

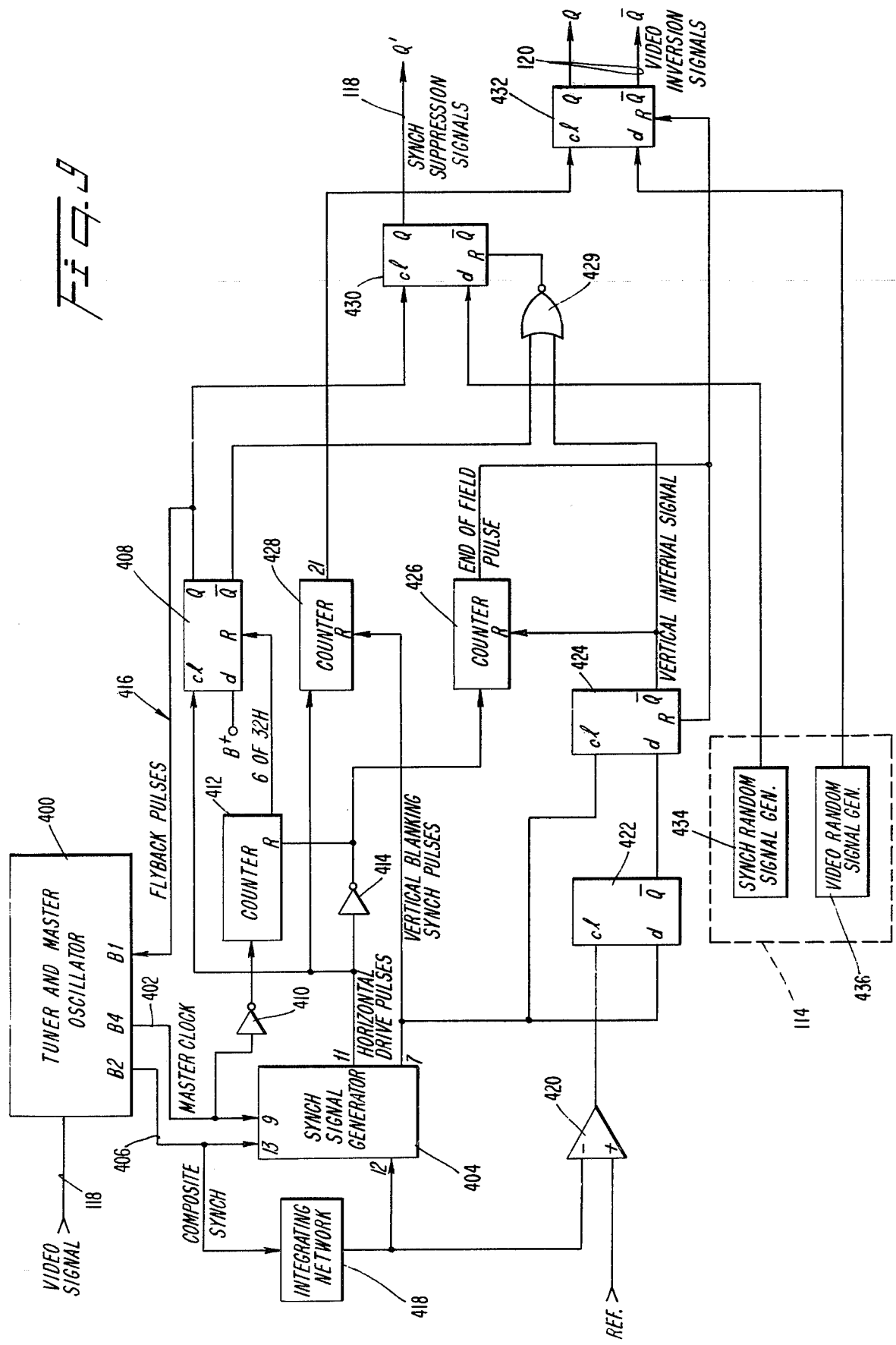

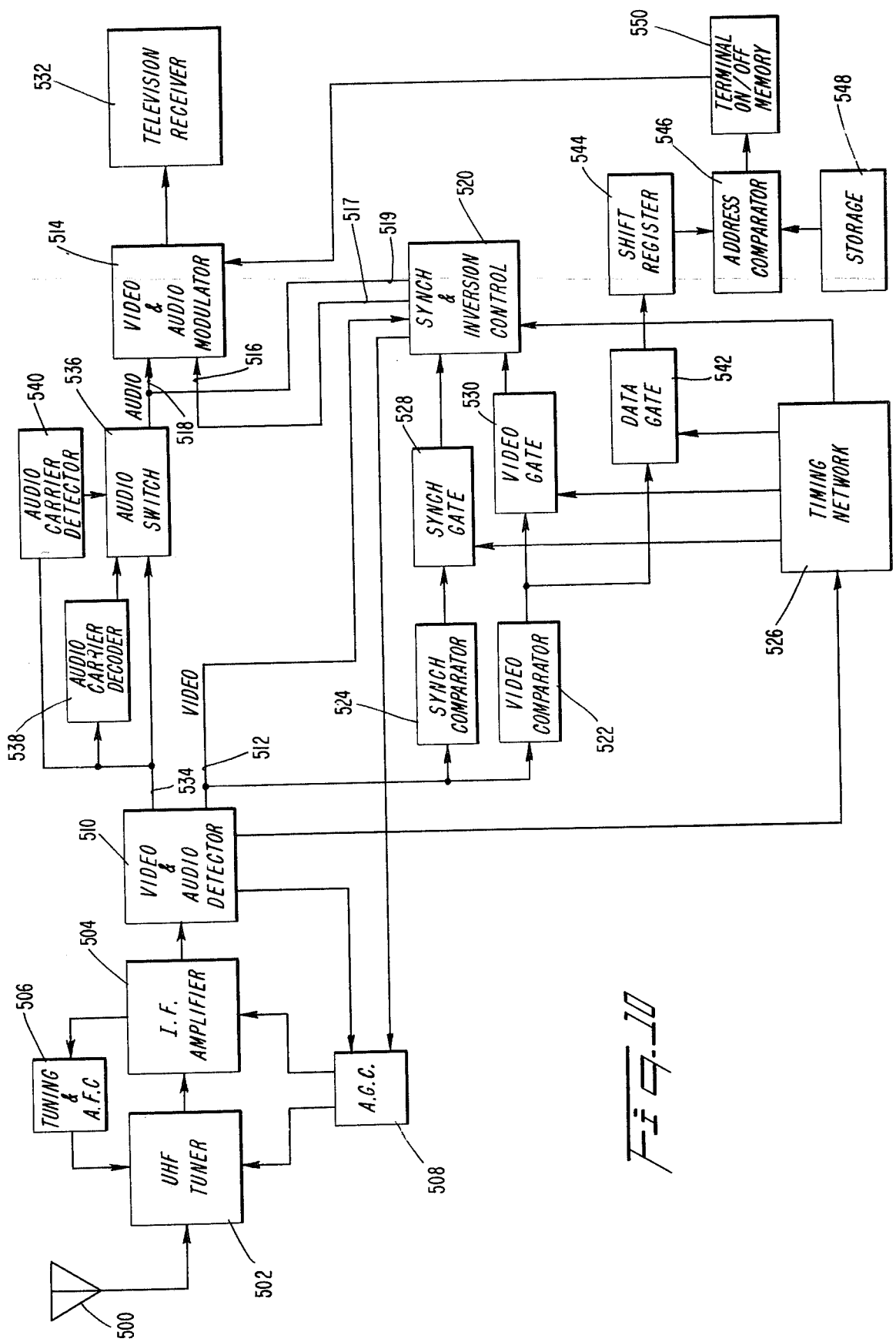

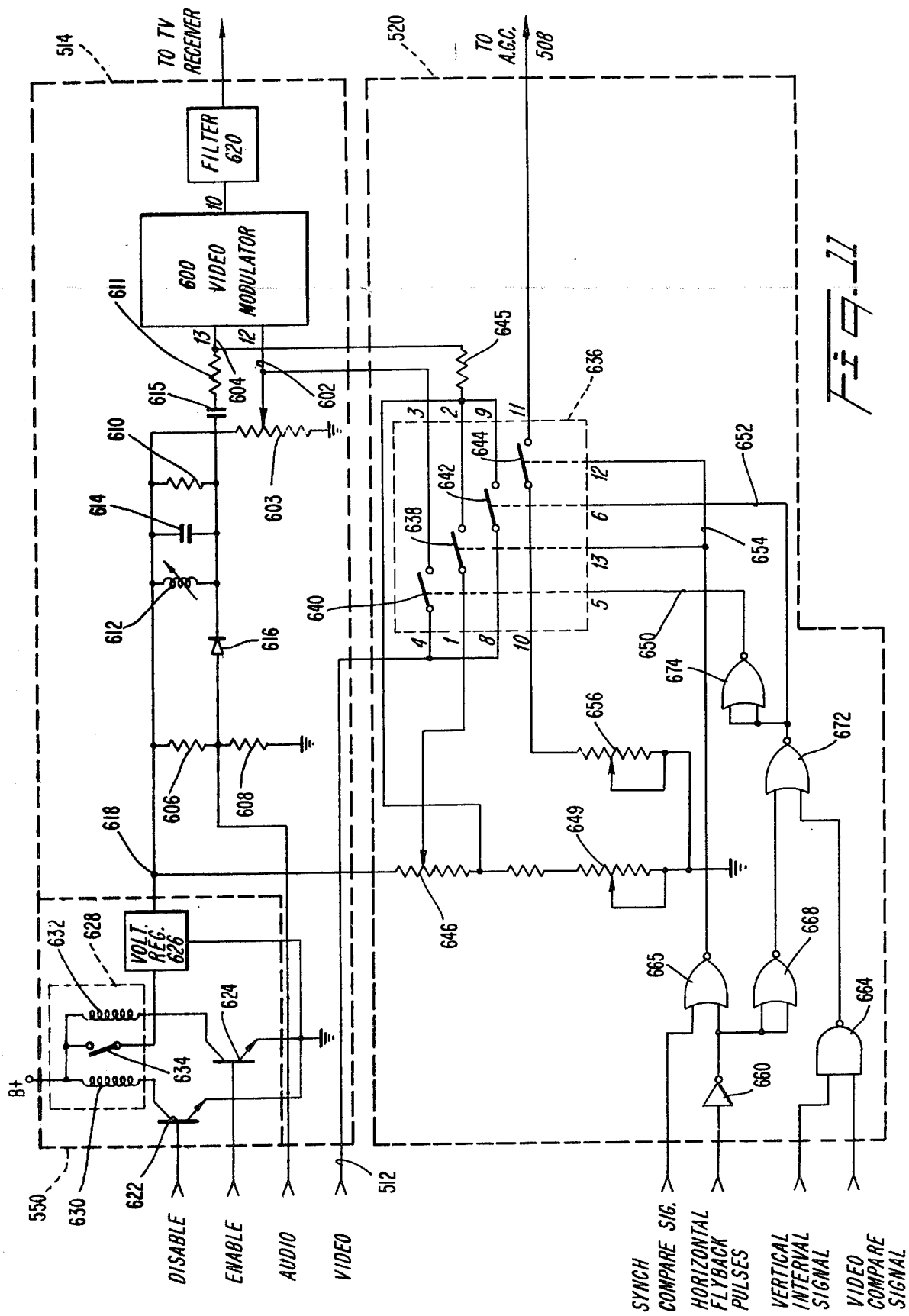

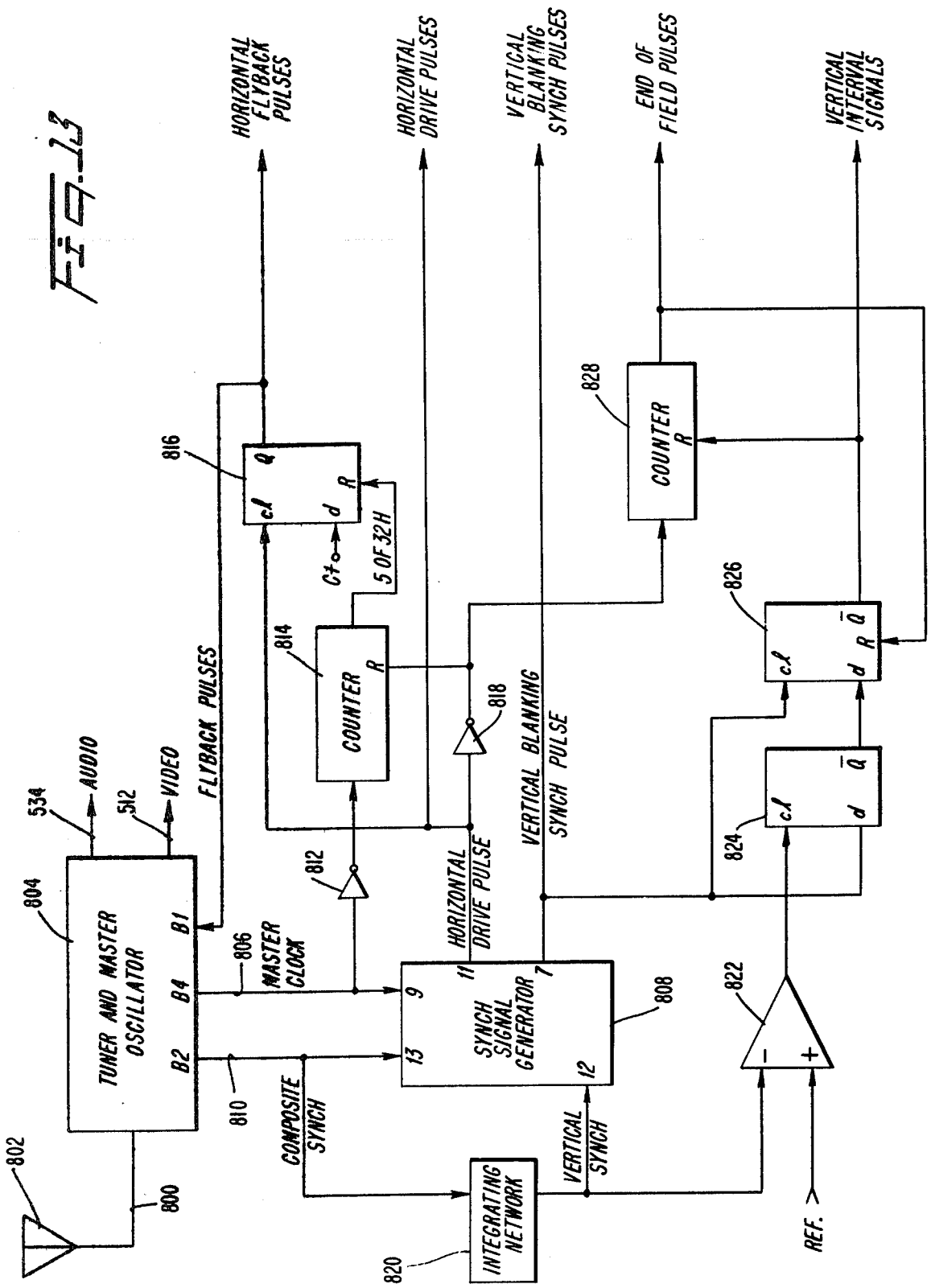

SUBSCRIPTION TELEVISION APPARATUS AND METHODS

BACKGROUND OF THE INVENTION

I. Field of the Invention

The present invention relates to apparatus and methods pertaining to the encoding and decoding of a television signal in a manner which deters unauthorized utilization of the signal.

II. Description of the Prior Art

Present day subscription television systems are based on the generally accepted fact that rendering a video picture unviewable in a normal television receiver is most easily and effectively accomplished by simply upsetting the horizontal synchronization of the receiver. It is known that horizontal synchronization can effectively be upset for standard NTSC receivers by simply removing the horizontal synchronization pulses or by suppressing the horizontal synchronization pulses below the average video level of the signal. This causes the television receiver to try to lock horizontally on random video peaks transmitted during the active or video trace line portions of the video signal rather than on the actual horizontal synchronization pulses. The fact that the horizontal synchronization pulses are no longer consistently processed also destroys a receiver's ability to use a color reference burst associated with the horizontal synchronization signals, thereby causing inaccurate color reproduction.

However, known systems which employ removal or suppression of horizontal synchronization pulses, require employment of an encoding signal, such as a control code or keying signal, to allow a decoder to reconstruct the missing or suppressed horizontal synchronization pulses. For example, the control code or keying signal may take the form of negative going encoding pulses inserted in selected locations of the horizontal blanking pulses. In the alternative, a totally independent signal, which contains the critical encoding information needed to reconstruct the horizontal synchronization pulses may be sent by a separate communication medium, such as the audio portion of the television signal or a telephone land line.

In addition to having the disadvantage of requiring transmission of an encoding signal to reconstruct the missing or suppressed horizontal synchronization pulses, presently known systems, which employ horizontal synchronization pulse suppression or removal, generate pictures which during a sequence with a stationary vertical (gray or black) line will sometimes allow a normal receiver to horizontally lock and display a recognizable picture, albeit with severe color distortion.

Some known subscription television systems employ circuitry to invert all or selected portions of the video signal to prevent unauthorized demodulation of the video signal content. For example, systems have been described which transmit even number fields with a conventional polarity and transmit odd number fields with reverse polarity with the resultant video signal generating a blank or washed-out picture in a standard television receiver. Other systems randomly invert fields or individual lines of video to establish a scrambled signal. To decode randomly inverted video, as is the case with decoding missing or suppressed horizontal synch pulses, known systems generally require the generation and communication of an additional control code, keying signal, or encoding signal, to allow a decoder to correctly reinvert the randomly inverted portions of the scrambled signal.

While systems have been described which employ aspects of both horizontal synchronization modification and video signal polarity modification to generate a scrambled signal, such systems also require the further inefficient process of generating, communicating, and decoding of some form of encoding signal in addition to the scrambled video signal.

It is therefore an object of the present invention to economically and efficiently render the video portion of the television signal scrambled to the point of being effectively unwatchable when displayed on a standard television receiver.

Another object of the present invention is to provide a subscription television system in which the scrambling of the video signal is secure in that it becomes difficult and costly for an unauthorized viewer to reconstruct to an acceptable viewing level.

A further object of the present invention is to provide a scrambling system having encoding and decoding devices which are economical to manufacture and install and yet provide a high quality video picture with a minimum of distortion and a minimum of viewer awareness that the picture is reconstructed from a previously scrambled transmission.

More specifically, it is an object of the present invention to provide a subscription television system wherein no complex control codes, keys or encoding signals are transmitted to control operation of a decoder, but rather the system employs a decoder which operates without preestablished or encoder-controlled format to follow the transmission sequence of suppressed horizontal blanking pulses and inverted video signals as they occur.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a subscribed television system is provided for selectively communicating a composite video signal having fields with horizontal trace lines separated by horizontal blanking pulses having front porches followed by horizontal synchronization pulses and the video signal further having vertical intervals separating the fields, the vertical intervals containing vertical synchronization information followed by horizontal trace lines separated by horizontal blanking pulses. The system of the present invention comprises: (a) video encoder means for randomly inverting the polarity of the video signal by inverting the polarity of a trace line of randomly selected vertical intervals and by inverting the trace lines of associated fields following the randomly selected vertical intervals, the encoder means further including means for suppressing the amplitude of randomly selected horizontal blanking pulses during the fields of the video signal to form a scrambled video signal; (b) detector means responsive to the polarity of the trace line of the vertical intervals for detecting the polarity of the trace lines of the associated fields, the detector means being further responsive to the amplitude of the scrambled video signal during selected time intervals for determining the suppression of randomly selected horizontal blanking pulses, and (d) decoder means responsive to the detector means for unscrambling the scrambled video signal. Preferably, the selected time intervals comprise time intervals of the front porches of the horizontal blanking pulses and the trace line of the vertical intervals comprises the last complete trace line in the vertical intervals. It is also preferable that the detector means includes means for comparing the amplitude of the scrambled video signal during the time intervals to a reference level which represents a level less than the amplitude of unsuppressed horizontal blanking pulses.

It is also preferable that the encoder means includes means for generating an audio subcarrier signal, means for generating an audio signal and means for modulating the audio subcarrier signal with the audio signal. The decoder also preferably includes means for detecting the audio subcarrier signal and for demodulating the subcarrier signal in response to detecting the audio subcarrier signal. The encoder may preferably also include means for inserting data signals into additional selected trace lines of the vertical intervals and the decoder then includes means responsive to the data signals to selectively enable or disable the decoder means.

The encoder of the present invention comprises (a) first means for randomly inverting the polarity of a video signal by inverting the polarity of a trace line of randomly selected vertical intervals and by inverting the trace lines of associated fields following the randomly selected vertical intervals, and (b) second means for suppressing the amplitude of randomly selected horizontal blanking pulses during fields of the video signal while maintaining unaltered the absolute amplitude difference between the horizontal blanking pulses and associated horizontal synchronization pulses.

The decoder of applicant's invention comprises: (a) first means for detecting the polarity of the trace line of the vertical intervals of the video signals, (b) second means for detecting the amplitude of the video signal at a selected time, (c) third means responsive to detection by the first means of the trace line having an inverted polarity for inverting the polarity of the associated fields, and (d) fourth means responsive to detection by the second means of the video signal having less than a first amplitude for biasing the video signal with a second amplitude signal for a selected time interval following said detecting by said second means. It is preferable that the trace line be the last complete trace line of the vertical intervals and that the last complete trace line normally have a black level amplitude and the inverted polarity be indicated by the last complete line having a white level amplitude. In addition, it is preferable that the selected time occur during the front porch of each horizontal blanking pulse and the selected time interval comprise the duration of each horizontal blanking pulse following the selected time.

In a more narrow sense, applicant's invention comprises a detector generating a video signal from a received composite video signal; a video modulator, the modulator having a first input terminal for the video signal and a second input terminal for a reference level, the modulator operable to generate a modulated television signal responsive to the difference between the video and reference signals at the first and second terminals; biasing means for establishing first, second and third differential signals between the first and second terminals upon receipt of first, second, and third control signals, respectively, the differential signals comprising the difference between said video and reference level signals, the first differential signal biasing the first and second terminals sufficiently for the modulator to generate a normal modulated television signal from the video signal, the second differential signal biasing the first and second terminals the same as the first differential signal but with the video and reference level signals interchanged at the input terminals whereby the modulator generates an inverted modulated television signal, and the third differential signal biasing the first and second terminals sufficiently for the modulator to generate a modulated television signal at a fixed level from the normal modulated television signal; first means for detecting the polarity of a selected trace line of vertical intervals of the video signal, second means for detecting the amplitude of the video signal during the initial portion of horizontal blanking pulses during the fields of the video signal, and control means for normally coupling the first control signal to the biasing means, the control means being responsive to detection by the first means of a selected trace line of the vertical interval having an inverted polarity to couple the second control signal to the biasing means during the trace lines of an associated field following the vertical interval, and the control means being responsive to detection by the second means of the initial portion of the horizontal blanking pulses having an amplitude below a predetermined level to couple the third control signal to the biasing means during the portion of the horizontal blanking pulses following the initial portion.

Preferably, the detector in the decoder of applicant's invention includes means for identifying horizontal synchronization pulses in the received composite video signal, the decoder includes a master scan oscillator phase-locked to the horizontal blanking pulses in response to the horizontal synchronization pulses, the master scan oscillator being coupled to the second means for detecting to identify the initial portion of the horizontal blanking pulses, and the biasing means further includes means coupled to the detector to bias the means for identifying the horizontal synchronization pulses during the portion of the horizontal blanking pulses following the initial portion in response to the third control signal to thereby prevent misoperation of said means for identifying during receipt of suppressed horizontal blanking pulses.

In still another sense, applicant's invention comprises a method for establishing a subscriber television system comprising the steps of (a) generating a video signal comprising fields having video sections and synchronization sections and associated vertical intervals having video sections and synchronization sections; (b) randomly inverting the video signal by inverting randomly selected fields and a portion of the video section of the vertical intervals associated with the randomly selected fields; (c) suppressing the amplitude of randomly selected horizontal blanking pulses in synchronization sections of the fields; (d) transmitting the scrambled video signal formed by the steps of generating, inverting and suppressing; (e) receiving the scrambled video signal; (f) reinverting the polarity of the fields of the received scrambled video signal upon determining that the polarity of the portion of the video section of the associated vertical intervals is inverted; (g) biasing each horizontal blanking pulse in the fields with a fixed amplitude signal immediately upon determining that the video signal during the beginning of the horizontal blanking pulse is below a predetermined amplitude; and (h) transmitting an unscrambled video signal formed by the steps of receiving, inverting and biasing to a television receiver.

In another sense, applicant's invention comprises a method for decoding a scrambled video signal comprising the steps of detecting the polarity of a portion of the video section of each vertical interval, reinverting the polarity of the fields of the scrambled video signal upon detecting that the polarity of the portion of the video section of the associated vertical interval is inverted; detecting that the amplitude of the scrambled video signal during the initial portion of each horizontal blanking pulse in the fields, and (d) biasing the amplitude of the scrambled video signal during the portion of the each horizontal blanking pulse in the fields following the initial portion of each pulse for which the step of detecting the amplitude reveals the amplitude as being below a predetermined level.

BRIEF DESCRIPTION OF THE DRAWINGS

The accompanying drawings, which are incorporated and constitute a part of the specification, illustrate a preferred embodiment of the invention and, together with the general description of the invention given above and the detailed description of the preferred embodiment given below, serve to explain the principles of the invention.

FIG. 1A illustrates a portion of a video signal including a vertical interval between the end of an even field and the beginning of an odd field;

FIG. 1B illustrates the portion of a video signal including the vertical interval between the end of an odd field and the beginning of an even field;

FIGS. 2A and 2B illustrate inverting the polarity of a video signal in accordance with the teachings of the present invention;

FIG. 3 illustrates suppressing the amplitude of a randomly selected horizontal blanking pulse in accordance with the teachings of the present invention;

FIG. 4 is a block diagram of a video encoder incorporating the teachings of the present invention;

FIG. 5 is a circuit diagram of a processing amplifier incorporating the teachings of the present invention;

FIG. 6 is a block diagram of a transmitter exciter incorporating the teachings of the present invention;

FIG. 7 is a schematic diagram of one example of employing the teachings of the present invention in a differential gain driver as illustrated in FIG. 6;

FIG. 8 is a schematic diagram of one example of incorporating the teachings of the present invention in a differential phase corrector as illustrated in FIG. 6;

FIG. 9 is a circuit diagram of a timing network employed in an encoder in accordance with the teachings of the present invention;

FIG. 10 is a block diagram of decoder constructed in accordance with the teachings of the present invention;

FIG. 11 is a circuit diagram of the synch and inversion control illustrated in FIG. 10;

FIG. 13 is a circuit diagram of one example of the timing network illustrated in FIG. 10.

Figure 12:
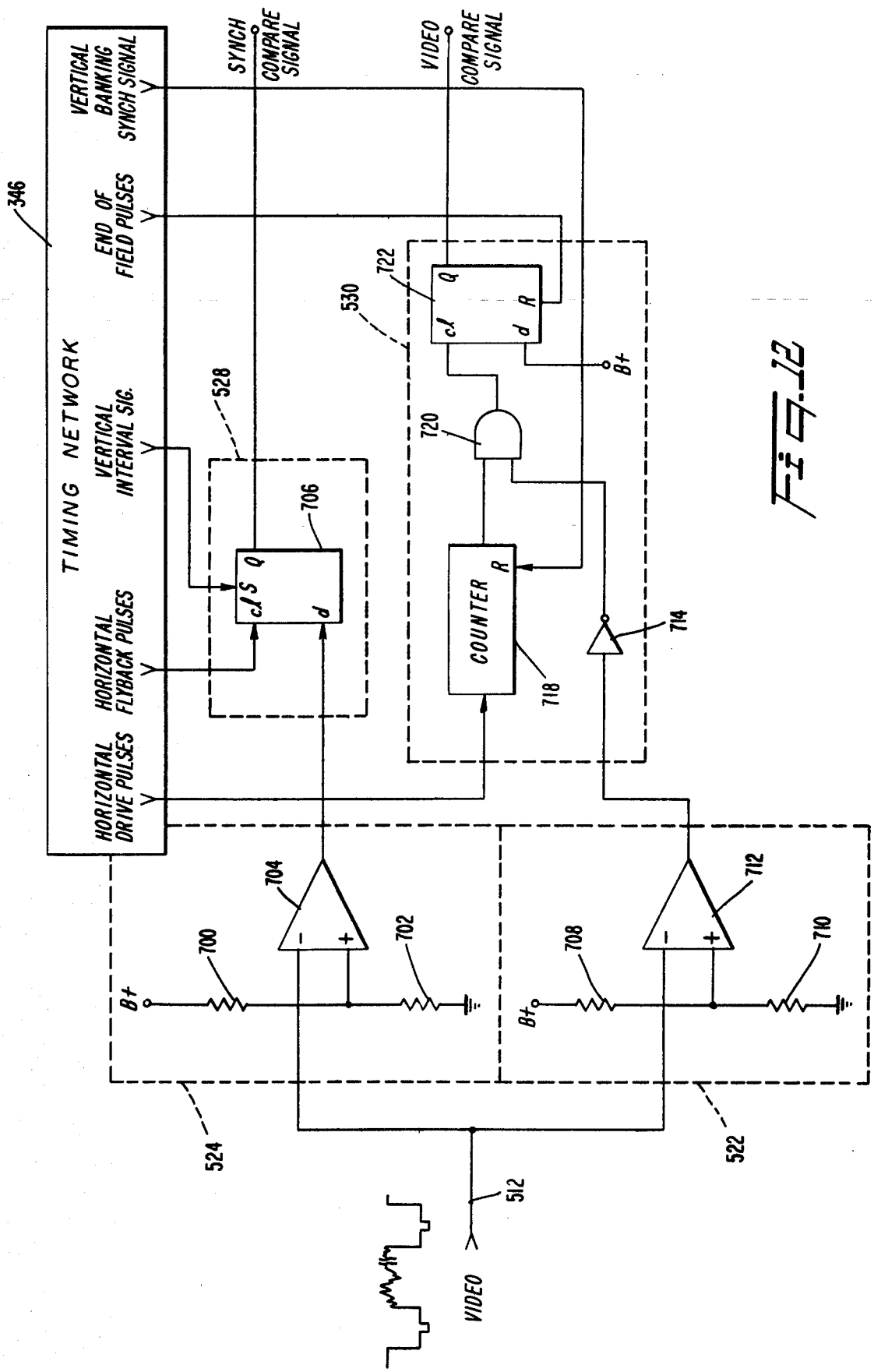
FIG. 12 is a circuit diagram of the synch comparator, video comparator, synch gate, and video gate illustrated in FIG. 10.

The above general description and the following detailed description are merely illustrative of the generic invention and additional modes, advantages, and particulars of this invention will be readily suggested to those skilled in the art without departing from the spirit and scope of the invention.

DESCRIPTION OF THE PREFERRED EMBODIMENT

Reference will now be made in detail to the present preferred embodiment of the invention as illustrated in the accompanying drawings.

Broadly, the present invention relates to a subscriber television system and method for selectively communicating a standard television video signal. Specifically, a standard television video signal may be defined as a composite video signal having fields with horizontal trace lines separated by horizontal synchronization pulses and further having vertical intervals separating the fields, the vertical intervals containing vertical synchronization information followed by horizontal lines separated by horizontal blanking pulses.

For example, as illustrated in FIGS. 1a and 1b, a composite video signal comprises even fields 10 and odd fields 12. As shown in FIG. 1a, the end of each even field 10 is separated from the beginning of each odd field 12 by a vertical interval 14 whereas as illustrated in FIG. 1b the end of each odd field 12 is separated from the beginning of each even field 10 by a vertical interval 15. Fields 10 and 12 include horizontal trace lines, several of which are illustrated in FIGS. 1a and 1b by trace lines 16, 18, 20, 22, 24, 26, 28, and 30. In addition, the end of each odd field 12 and the beginning of each even field 10 contain half trace lines 32 and 34, respectively.

The horizontal trace lines of fields 10 and 12 are each separated by horizontal blanking pulses 36. A horizontal blanking pulse 36 is illustrated, for example, in FIG. 3 as having a front porch 38 typically of approximately 2 microsecond duration and a back porch 40 which typically carries on it a color burst signal 42. Horizontal blanking pulses 36 each further carry a horizontal synchronization pulse 44 following front porch 38 and preceding back porch 40. It is of course to be understood that the present invention is also obviously applicable to composite video signals which exhibit the essential format in the above set out composite video signal, although such other composite video signals may exhibit additional features or minor modifications.

Vertical intervals 14 and 15 as illustratively shown in FIGS. 1a and 1b typically contain vertical synchronization information comprising, for example, equalizing pulses 46 followed by a serrated vertical synchronization pulse 48 which in turn is followed by additional equalizing pulses 50. The vertical synchronization information is in turn typically followed by horizontal trace lines 52 which are separated by horizontal blanking pulses 54 that contain horizontal synchronization pulses 56. In addition, vertical interval 15 which separates the end of odd fields 12 from the beginning of even fields 10, terminates in a half horizontal trace line 58.

In accordance with the present invention, a subscriber television system comprises video encoder means for randomly inverting the polarity of the video signal by inverting the polarity of a trace line of randomly selected vertical intervals and by inverting the trace lines of associated fields following said randomly selected vertical intervals, the said encoder means further including means for suppressing the amplitude of randomly selected horizontal blanking pulses during the fields of the video signal to form a scrambled video signal.

In FIGS. 2a and 2b, for example, a trace line 60 of vertical intervals 62 is shown to have approximately a 75% amplitude level which in the art is normally indicative of a black or blanking level. In FIG. 2b, trace line 60 is shown to have an inverted polarity such that an indication of black or blanking level is now represented by an approximately 10% amplitude signal. Accordingly, the video signal of FIG. 2b represents one illustrative and not limiting example of a trace line of a vertical interval having an inverted polarity.

In FIG. 2a fields 64 follow and therefore may be said to be associated with vertical intervals 62. Associated fields 64, as was explained above with respect to fields 10 and 12 in FIGS. 1a and 1b, contain a series of trace lines 66 separated by horizontal blanking pulses 68. Trace lines 66 are represented in FIG. 2a to contain video information which information, in accordance with standard United States television practice, represents a white signal at 10% amplitude and a black signal at 75% amplitude. In FIG. 2b, however, trace lines 66 have been inverted and therein represent a white signal at 75% amplitude and a black signal at 10% amplitude signal. Thus, while the video signal represented by FIG. 2a would result in a normal television picture in a standard television receiver, the video signal of FIG. 2b would result in an inverted or "negative" television signal in a standard television receiver. The video signal of FIG. 2b therefore represents a partially scrambled video signal.

The subscriber television system of the present invention further comprises a video encoder means including means for suppressing the amplitude of randomly selected horizontal blanking pulses during the fields of the video signal to form a scrambled video signal.

Again, for purposes of illustration and not limitation, attention is called to FIG. 3 wherein a standard horizontal blanking pulse 36 of a field is illustrated. Blanking pulse 36 is illustrated as achieving approximately 75% amplitude for the entire time duration 70 of the blanking pulse. In addition, following front porch 38, a horizontal synchronization pulse 44 is shown mounted on horizontal blanking pulse 36. A suppressed horizontal blanking pulse 72 is illustrated in FIG. 3 as having a constant 25% level amplitude during the entire time duration 70. However, it should be noted that while suppressed horizontal blanking pulse 72 has a lower level amplitude than horizontal blanking pulse 36, the differential 74 between the level of horizontal blanking pulse 36 and the level of horizontal synchronization pulse 44 remains unaltered. Preferably, horizontal blanking pulse 36 is suppressed to a level such that horizontal synchronization pulse 44 will fail to lock a standard television receiver into horizontal synchronization.

In FIG. 4 there is illustrated a block diagram of one example of video encoder incorporating the teachings of the present invention to randomly invert a video signal as is illustrated in FIGS. 2a and 2b and to suppress randomly selected horizontal blanking pulses as is illustrated in FIG. 3. The decoder of FIG. 4 comprises a standard television camera 100 having a video output 102 coupled to the series combination of processing amplifier 104, transmitter exciter 106, transmitter 108, and antenna 110. As is well-known to those skilled in the art, processing amplifier 104 takes video output 102, which comprises a composite video signal, shapes and or reforms the color burst signal, controls the gain and bandwidth of the video signals, and/or shapes and/or reforms the synchronization signals to create a reconstituted composite video signal on output line 112 to exciter 106. As is also well-known to those skilled in art, exciter 106 continues to shape and form the reconstituted video signal for suitable application to transmitter 108 which radiates the video signal by means of antenna 110.

The encoder of FIG. 4 further includes a random signal generator 114 and a timing network 116. As will be explained in greater detail below, a processing amplifier 104 is modified to operate in connection with timing network 116 to randomly invert video output 102 by inverting the polarity of a trace line of vertical intervals randomly selected by generator 114 and by inverting the trace lines of associated fields following the randomly selected vertical intervals. Furthermore, as will be explained in detail below, exciter 106 is modified to operate in conjunction with timing network 116 to suppress the amplitude of horizontal blanking pulses during fields, which blanking pulses are also, but differently, randomly selected by generator 114. Thus, the output of exciter 106 includes a scrambled video signal whose polarity is randomly inverted as, for example, is illustratively shown in FIG. 2b and whose horizontal blanking pulses are randomly suppressed as is illustratively shown in FIG. 3.

Timing information from video output 102 is transmitted from processing amplifier 104 to timing network 116 over line 118 while gating signals to randomly invert the video signal are communicated from timing network 116 to processing amplifier 104 over line 120 and gating signals to suppress randomly selected horizontal blanking pulse are transmitted from timing network 116 to transmitter exciter 106 over line 122.

In accordance with the present invention, an encoder includes means for generating an audio subcarrier signal, means for generating an audio signal, and means for modulating said audio subcarrier with said audio signal.

As also illustratively shown in FIG. 4, audio subcarrier generator 124 is coupled between microphone 126 and transmitter exciter 106. Audio subcarrier 124 allows programmed audio to be transmitted on an audio subcarrier such as that used for "store cast" or background music transmission by FM radio as is well-known to those skilled in the art. Generator 124 may, for example, generate a 39.5 mhz subcarrier signal which is modulated by audio from microphone 126. The thus modulated signal is in turn used to modulate a 4.5 mhz oscillator in transmitter exciter 106.

Further in accordance with the present invention an encoder preferably includes means for inserting data signals into additional selected trace lines of the vertical intervals.

As also illustratively shown in FIG. 4, data register 128 is coupled to data gate 130. In data register 128 data information may, for example, comprise 24 bits and be sent at approximately a 500 khz bit rate. The format may, for example, be 2 frame bits, 19 binary code address bits, one parity bit and two command data bits. The command data bits may serve to set or reset a magnetically latching relay in a decoder which will either enable or disable the decoder operation, and which will remain in its assigned state even in the case of power interruption at the decoder as will be explained more fully below.

Under control of timing network 116, data gate 130 operates to pass digital information from data register 128 to processing amplifier 104 during selected trace lines of the vertical intervals of the video signal. For example, three trace lines of each vertical signal may be employed to transmit data information, and the information may be transmitted in digital form with an uninverted portion of a trace line indicating a zero data bit and an inverted portion of a trace line indicating a one data bit. Accordingly, the same mechanism utilized in processing amplifier 104 to randomly invert the polarity of the video signal, as will be explained in detail below, can also be employed by data gate 130 to generate data information during trace lines of the vertical intervals.

In FIG. 5 a circuit diagram is provided showing one example of processing amplifier 104. In FIG. 5 processing amplifier 104 is illustrated as comprising diplexer 200, color burst processor 202, video processor 204, synch detector 206, synch processor 208, and combiner 210. As is well-known to those skilled in the art, diplexer 200 may operate to separate a color burst signal which is delivered by line 212 to color burst processor 202 from a video signal which is delivered by line 214 to video processor 204. Color burst processor 202 essentially reconstructs the color burst signal of the composite video received by diplexer 200, for example, by phase-locking a stable 3.58 mhz oscillator to the incoming color burst signal. Video processor 204 may, for example, control the gain and bandwidth of the video signal. It may also extend low or high frequency components, or cut-off unwanted portions of the video signal to give control over the formation and shaping of the video signal.

The video signal on line 214 from diplexer 200 is also communicated to synch detector 206 which, as is well-known in the art, separates horizontal and vertical synch information from the composite video signal introduced to diplexer 200. The output of synch detector 206 is coupled to synch processor 208 which, like color burst processor 202, essentially operates to reconstruct the synchronization signals by phase-locking an internal oscillator to the incoming synchronization signals. Signal processor 208 thereby reconstructs and shapes the synchronization signals of the composite video signal.

In a standard processing amplifier, such as Grass Valley Group Processing Amplifier, model 3240, the reconstructed color burst signals, video signals, and synchronization signals are combined in a combiner 210 to form a reconstituted composite video signal.

As explained above, the subscriber televison system of the present invention includes encoder means for randomly inverting the polarity of a video signal. For the purposes of illustration and not limitation, attention is called to analog switch 216, resistors 218, 220, 222, and 224, and differential amplifier 226 in FIG. 5. The output of differential amplifier 226 is shown in FIG. 5 coupled to the video input of combiner 210. Feedback resistor 224 couples the output of amplifier 226 to the negative input. The negative input of amplifier 226 is in turn coupled to incoming video from video processor 204 through the series combination of first pole 228 of analog switch 216 and resistor 218. The positive input of differential amplifier 226 is coupled to the video from video processor 204 through second pole 230 of analog switch 216. First pole 228 of analog switch 216 is closed upon receipt of a Q gating signal on line 120 from timing network 116 whereas second pole 230 is closed upon receipt of a $\overline{Q}$ gating signal over line 120 from timing network 116.

In operation of processing amplifier 104 as illustrated in FIG. 5, a $\overline{Q}$ gating signal from timing network 116 over line 120 closes second pole 230 of analog switch 216 and allows the video signal from video processor 204 to be transferred uninverted through differential amplifier 226 to combiner 210. Accordingly, a normal reconstituted composite video signal is generated by processing amplifier 104 when a $\overline{Q}$ gating signal appears on line 120. However, when a Q gating signal appears on line 120 second pole 230 is opened and first pole 228 is closed communicating the video signal from video processor 204 to the negative input of differential amplifier 226 and thereby causing inversion of the video signal resulting in a reconstituted composition video signal with an inverted video portion.

It should be noted that since the reconstituted synchronization components of the video signal are inserted into the composite video signal by operation of synch detector 206 and synch processor 208, the inversion of the video signal from line 204 before introduction to combiner 210 has no effect on the polarity of the synchronization signals. Accordingly, first pole 228 of analog switch 216 may be closed at the beginning of the last full trace line of a vertical interval and remain closed throughout the subsequent field until the beginning of the next vertical interval without in any way inverting or otherwise affecting the shape of the synchronization signals of the reconstituted composite video output from processing amplifier 104. Thus, all that is required to achieve a desired random inverting of the polarity of a video signal introduced to processing amplifier 204 is a gating signal Q on line 120 which begins at the beginning of a selected trace line of a randomly selected vertical interval and continues throughout the succeeding field until the beginning of the next vertical interval.

It should of course be understood that random inverting of the polarity of a video signal by inverting the polarity of a trace line of randomly selected vertical intervals and by inverting the trace lines of associated fields following the randomly selected vertical intervals can be achieved in a number of alternative manners consistent with the spirit and scope of the present invention. For example, an inverter may be inserted in the composite video signal path and triggered during a selected trace line of randomly selected vertical intervals and triggered during the trace lines of associated fields following the randomly selected vertical intervals. This method of inverting the polarity of the video signal, however, requires a gating signal which disables the inverter during horizontal synchronization signals which is not required in the processing amplifier 104 illustrated in FIG. 5.

As mentioned above, the video encoder means of the subject invention further includes means for suppressing the amplitude of randomly selected horizontal blanking pulses during the fields of said video signal to, in conjunction with the randomly inverted video signal, form a scrambled video signal. For purposes of illustration and not limitation, attention is called to FIG. 6 wherein there is disclosed a block diagram of a transmitter exciter incorporating the teachings of the present invention.

The example of exciter 106 shown in FIG. 6 comprises the series combination of differential amplifier 300, video gain control 302, driver amplifier 304, differential gain driver 306, differential gain correctors 308, differential phase drive 310, and differential phase corrector 312. Differential gain driver 306 is limited during horizontal synchronization pulses by operation of video clamp amplifier 314 which is in turn controlled by clamp pulse generator 316 and by differential phase corrector 312 over line 318.

Exciter 106 of FIG. 6 represents the basic design of an RCA Exciter Model No. TTUE-4A. It is of course intended that any comparable form of exciter may be employed in connection with the teachings of the present invention.

Any suitable point may be chosen along the video path including differential amplifier 300, video gain control 302, driver amplifier 304, differential gain driver 306, differential gain corrector 308, differential phase driver 310 and differential phase corrector 312 to suppress horizontal blanking pulses in response to a gating signal from timing network 116 of FIG. 4. For example, in FIG. 6 a gating signal $\overline{Q}$ from line 122 of timing network 116 is shown coupled to differential gain driver 306. Gating signal $\overline{Q}$, as will be explained below, appears during randomly selected horizontal blanking pulses and operates to alter the bias of differential gain driver 306 by a fixed amount during such randomly selected horizontal synchronization pulses. Furthermore, since video clamp amplifier 314 attempts to clamp the horizontal synchronization pulses at a fixed level, it is necessary to also introduce gating signal $\overline{Q}$ to differential phase corrector 312 during the randomly selected horizontal blanking pulses to effectively prevent the operation of video clamp amplifier 314 from attempting to rebias the suppressed horizontal blanking pulses to their normal unbiased level.

FIG. 7 is a schematic diagram of one example of a portion of differential gain driver 306 employing the teachings of the present invention. Specifically, FIG. 7 illustrates a simple differential amplifier comprising transistors 320 and 322 with video input coupled to the base of transistor 320 and video output taken from the collector of transistor 320. The video output, as can be fully appreciated by one skilled in the art, reflects the biasing level applied to the base of transistor 322. Accordingly, the video output from transistor 320 can be selectively biased by the employment of an analog switch 324 in series with variable resistor 326 connected between the base of transistor 322 and a B+ voltage supply. The value of resistor 326 is chosen such that upon closure of analog switch 324 by gating signal $\overline{Q}$ the video output from transistor 320 is biased a fixed amount from normal biasing levels. For example, with reference to FIG. 3, the value of resistor 326 may be chosen such that upon closure of analog switch 324 during a horizontal blanking interval, the level of the horizontal blanking pulse is reduced from approximately 75% amplitude to 25% amplitude.

An example of a portion of differential phase corrector 312 is illustrated in FIG. 8. Specifically, a buffer amplifier which forms the output of differential phase corrector 312 is illustrated in FIG. 8 as comprising transistors 328 and 330 series coupled between a B+ and a B− voltage supply by resistors 332 and 334. The base of transistor 330 is coupled to the B+ supply by diode 336 and resistor 332 and is coupled to the B− supply by resistor 337. The base of transistor 328 is coupled to receive the video input whereas buffered video output is provided to transmitter 108 of FIG. 4 through resistor 338 coupled to the junction of the emitter of transistor 328 and the collector of transistor 330. A controlled video feedback is provided to video clamp amplifier 314 of FIG. 6 through resistor 340 which is also coupled to the junction of the emitter of transistor 328 and the collector of transistor 330.

To prevent operation of video clamp amplifier 314 from clamping the video signal in differential gain driver 306 of FIG. 6 to the normal bias level of a horizontal synchronization pulse during randomly selected suppressed horizontal blanking pulses, the video output from resistor 340 in FIG. 8 is selectively coupled to the B− bias by the series combination of analog switch 342 and variable resistor 344. Analog switch 342 is controlled by the $\overline{Q}$ gating signal from line 122 of timing network 116 to close analog switch 342 during each randomly selected horizontal blanking pulse to effectively trick video clamp amplifier 314 into believing that a normal horizontal blanking pulse is present. In this manner, the video output from resistor 338 of differential phase corrector 312 will pass randomly selected horizontal blanking pulses of suppressed amplitude.

It should of course be understood that the suppression of randomly selected horizontal blanking pulses can be achieved in accordance with the teachings and spirit of the present invention in many alternative manners and that the specific circuits of FIGS. 6, 7 and 8 are set out to illustrate a single example of how suppression of the amplitude of randomly selected horizontal blanking pulses may be achieved.

FIG. 9 provides a circuit diagram of one illustrative, but non-limiting example of timing network 116 of FIG. 4. In FIG. 9, a video signal is provided on line 118 from processing amplifier 104 in FIG. 4. The video signal on line 118 is shown coupled to the video input of tuner and master oscillator 400. Tuner and master oscillator 400 is known to those skilled in the art having a standard TV tuner and an internal oscillator which is locked to horizontal synchronization signals, either the horizontal blanking signals or the horizontal synchronization pulses. Specifically, master oscillator 400 may comprise an M1 Module of Zenith Corporation which is presently employed in many commercially available Zenith televisions. The M1 Module employs a 503.5 kHz master scan oscillator which is phased-locked to 32 times the horizontal rate of a video signal received by the tuner section. A master clock output of the oscillator 400 is coupled by line 402 to synch signal generator 404. When master oscillator 400 is an M1 Module, line 402 is coupled to terminal B4.

Synch signal generator 404, as is well-known to those skilled in the art, provides horizontal drive pulses and vertical blanking synchronization pulses in response to receipt of a master clock signal and a composite synchronization signal. Synch signal generator 404 may, for example, comprise a Zenith 221-103 chip which is also presently employed in commercially available Zenith televisions.

A composite synchronization signal is provided to synch signal generator 404 from line 406 coupled to master oscillator 400. A composite synchronization signal merely comprises the horizontal and vertical synchronization signals from the video signal on line 118. For example, a suitable composite synchronization signal can be received from terminal B2 of a Zenith M1 Module.

Horizontal drive pulses are generated by synch signal generator 404 in response to the master clock signal on line 402 and the composite synchronization signal on line 406. Horizontal drive pulses are defined with respect to timing network 116 as a square wave locked to the horizontal synchronization rate which passes from negative to positive at or slightly before the beginning of each horizontal blanking pulse. Vertical blanking synchronization pulses from synch signal generator 404 are defined with respect to timing network 116 as a signal which is negative going halfway through the vertical synchronization pulse of a video signal and remains negative going until termination of the vertical interval.

In FIG. 9, with horizontal synchronization generator 404 representing a Zenith 221-103 chip, output terminal 11 of synch signal generator 404 is coupled to the clocked input of flip-flop 408. In addition, the master clock signal on line 402 is coupled through inverter 410 to the input of counter 412, while a reset signal is supplied to counter 412 from the horizontal drive pulses of output terminal 11 of synch signal generator 404 through inverter 414. Upon the beginning of each horizontal drive pulse counter 412 is enabled to provide an output upon receipt of six master clock signals to reset flipflop 408. The Q output of flip-flop 408, namely flyback pulses, are coupled from flipflop 408 by line 416 to the B1 terminal of master oscillator 400. This interconnection of master oscillator 400, synch signal generator 404, counter 412 and flip-flop 408 assures that the flyback pulses on line 416 are centered on the horizontal synchronization signals of the video signal and have a duration of six of the 32 oscillations of master oscillator 400 which occur for each video line. Accordingly, the flyback pulses on line 416 begin just slightly before the beginning of each horizontal blanking pulse and terminate just slightly after the termination of each horizontal blanking pulse.

The timing network illustrated in FIG. 9 further includes integrating network 418, differential amplifier 420, flip-flops 422 and 424 and counter 426. Integrating network 418 is coupled to receive the composite synchronization signal on line 406 and is designed to provide as an output vertical synchronization signal to pin 12 of synch signal generator 404 and to the negative input to comparator 420. The application of vertical synchronization pulses to pin 12 of synch signal generator 404 assures generation of vertical blanking synchronization pulses at pin 7 of generator 404 as is known to those skilled in the art. In addition, the application of vertical synchronization to the negative input of comparator 420 with the positive input of comparator 420 coupled to a reference point will generate at the output of comparator 420 a signal pulse with positive transition after the trailing edge of the vertical synchronization pulse if a vertical synchronization pulse is in fact present in the composite video signal.

The output of differential amplifier 420 is coupled to the clock input of flip-flop 422 which has a data input coupled to receive the vertical blanking synch pulses from pin 7 of synch signal generator 404. Since flip-flop 422 is clocked by the positive transition signal from differential amplifier 420 if a vertical synchronization pulse is present in the video signal, the output of the flip-flop 422 will go high and stay high when the vertical blanking synch pulses from generator 404 are properly phase-locked to the incoming video signal. The $\overline{Q}$ output of flip-flop 422 is coupled to the data input of flip-flop 424 whereas the vertical blanking synchronization pulses are coupled to the clock input of flip-flop 424. The reset of flip-flop 424 is coupled to the output of counter 426 which, in turn, has as an input the inverted horizontal drive pulses from inverter 414 and has a reset coupled to the $\overline{Q}$ output of flip-flop 424. Counter 426 is designed to provide a short end of field pulse at the start of each vertical interval. Since flip-flop 424 is clocked at the end of each vertical interval and is reset at the end of each field, the $\overline{Q}$ output of flip-flop 424 generates a vertical interval signal which is high during the vertical interval and low during the fields between vertical intervals.

The timing network of FIG. 9 further comprises counter 428, OR gate 429, and flip-flops 430 and 432. Counter 428 is coupled to receive the horizontal drive pulses from synch signal generator 404 as an input and to receive the vertical blanking synch pulses from generator 404 as a reset signal. Counter 428 therefore begins counting half way through the vertical synchronization pulse of a vertical interval and continues to count horizontal drive pulses until the beginning of a chosen trace line of the vertical interval, preferably the last complete trace line of the vertical interval.

The output of counter 428 is coupled to the clock input of flip-flop 432 whereas the data input of flip-flop 432 is coupled to random signal generator 114. Random signal generator 114 may, for example, comprise two separate random signal generators namely synch random signal generator 434 and video random signal geneator 436. In that case, the data input to flipflop 432 is coupled to video random signal generator 436. The reset of flip-flop 432 is coupled to the output of counter 426. Accordingly, flip-flop 432 operates to provide a high output at the Q terminal during the last line trace of randomly selected vertical intervals and to continue a high Q output during the field which follows the randomly selected vertical interval. The output of flip-flop 432 is coupled over line 120 to processing amplifier 104 of FIG. 4, and specifically is coupled to analog switch 216 of FIG. 5 as described above.

Flip-flop 430 has a clock input coupled to receive flyback pulses from line 416 and a data input coupled to synch random signal generator 434. OR gate 429 is coupled to receive at a first input terminal the inverse of flyback pulses on line 416 from the $\overline{Q}$ output of flip-flop 408. OR gate 429 is also coupled to receive at a second input the vertical interval signals from the $\overline{Q}$ output of flip-flop 424. The output of OR gate 429 is coupled to the reset terminal of flip-flop 430. Flip-flop 430 accordingly operates to provide a high output or Q gating signal at line 118 during randomly selected horizontal synchronization pulses since, when synch random signal generator 434 is high at the beginning of a flyback pulse on line 416, a high output is generated at the Q output of flip-flop 430 until flip-flop 430 is reset slightly after the end of the horizontal blanking signal by the $\overline{Q}$ output of flip-flop 408 through OR gate 429. In addition, flip-flop 430 is disabled during vertical intervals by the operation of the vertical interval signal of flip-flop 424 applied to the second input of OR gate 429 whose output in turn drives the reset terminal of flip-flop 430.

In summary, the output on lines 120 from flip-flop 432 in FIG. 9 is coupled to processing amplifier 401 of FIG. 4 and provides inversion of the polarity of a trace line of randomly selected vertical intervals and inversion of trace lines of the field following the randomly selected vertical intervals. The output on line 118 of flip-flop 430 in FIG. 9 is coupled to transmitter exciter 106 in FIG. 4 and provides suppression of the amplitude of randomly selected horizontal blanking pulses during fields of the video signals. The combination of the random inversion of the polarity of the video signal and the suppression of randomly selected horizontal blanking pulses provides a scrambled video signal to transmitter 108 of FIG. 4 which signal is unintelligible at a normal television receiver.

In accordance with the subscriber television system of the present invention, the system further comprises a decoder means responsive to the polarity of the trace line of the vertical intervals for detecting the polarity of the trace lines of said associated fields, the detector means being further responsive to the amplitude of the scrambled video signal during selected time intervals for detecting the suppression of the randomly selected horizontal blanking pulses, and decoder means responsive to the detector means for unscrambling the scrambled video signal.

As applicable to the specific waveforms illustrated in FIGS. 2b and 3, a specific embodiment of the present invention may, for example, include a decoder which is responsive to the polarity of trace line 60 of each vertical interval 62 for detecting the polarity of the trace lines 66 of associated fields 64. For the specific illustrative waveforms shown in FIGS. 2b and 3, an example of a detector of the present invention is further responsive to the amplitude of the scrambled video signal during time period 70 of FIG. 3 which is the time period of horizontal blanking pulses, for detecting the amplitude of the horizontal blanking pulses. Preferably the detection occurs during the period of front porch 38 to detect the suppression of randomly selected horizontal blanking pulses. In this specific example, a decoder is also provided which is responsive to detection of an inverted trace line 60 of FIG. 2b and responsive to detection of a suppressed horizontal blanking pulse during front porch 38 as shown in FIG. 3 for unscrambling the scrambled video signal.

More specifically, a television decoder in accordance with the present invention preferably comprises a detector generating a video signal from the received composite video signal. In the specific example of a decoder illustrated in FIG. 10, antenna 500, UHF tuner 502, IF amplifier 504, tuning and automatic frequency control 506, automatic gain control 508, and video and audio detector 510 provide a video signal on line 512 from a received composite video signal at antenna 500. More specifically, as is well-known to those skilled in the art, UHF tuner 502 may, for example, convert a received composite video signal to a standard 45.75 MHz television intermediate frequency whereupon it is amplified and band-limited by intermediate frequency amplifier 504. Tuning and automatic frequency control 506 is coupled from intermediate frequency amplifier 504 to UHF tuner 502 to set the tuner at a specific received frequency which is preferably set at the manufacturing facilities and not accessible to the viewing public. The signal from intermediate amplifier 504 is then demodulated to composite base band video by video and audio detector 510 again as is well-known to those skilled in the art. Video and audio detector 510 generates a standard automatic gain control signal to automatic gain control 508 in order to keep the operation of UHF tuner 502 and the operation of intermediate frequency amplifier 504 at the proper level.

In accordance with the present invention, the decoder preferably further comprises a video modulator, the modulator having a first input terminal for the video signal and a second input terminal for a reference level signal, the modulator operable to generate a modulated television signal responsive to the difference between the video and reference level signals at the first and second terminals.

In the specific example illustrated in FIG. 10 a video and audio modulator 514 is shown having a first input terminal 516 and a second input terminal 518. Video and audio modulator 514 may, for example, comprise video modulator chip number LM 1889N which is normally currently found employed in video games to impress a video signal on a radio frequency carrier. The output of modulator 514 is coupled to television receiver 532 and comprises a video signal proportional to the differential between the signal appearing at first terminal 516 and second terminal 518.

In accordance with the present invention, the decoder preferably further comprises biasing means for establishing first, second, and third differential signals between the first and second terminals upon receipt of first, second, and third control signals, respectively, the difference signals comprising the difference between the video and reference level signals, the first differential signal biasing the first and second terminals sufficiently for the modulator to generate a normal modulated signal from the video signal, the second differential signal biasing the first and second terminals the same as the first differential signal but the video and reference level signals interchanged at the input terminals, whereby said modulator generates an inverted modulated television signal, and the third differential signal biasing said first and second terminals sufficiently for the modulator to generate a modulated television signal at a fixed level from the normal modulated signal.

In the specific example of a decoder illustrated in FIG. 10, synch and inversion control 520 is shown having one output 517 coupled to first input terminal 516 of video and audio modulator 514 and another output 519 coupled to second input terminal 518 of modulator 514. As will be explained in greater detail below, synch and inversion control 520 operates in response to first, second, and third internal control signals to provide differential signals between first and second terminals 516 and 518 of video and audio modulator 514.

Further in accordance with the present invention the decoder also comprises first means for detecting the polarity of a selected trace line of vertical intervals of the video signal, and second means for detecting the amplitude of the video signal during the initial portion of horizontal blanking pulses during the fields of the video signal. In the specific example of the decoder illustrated in FIG. 10, a video comparator 522 continuously detects the polarity of the video signal appearing on line 512 and synch comparator 524 continuously detects the amplitude of the video signal appearing on line 512.

The detector illustrated in FIG. 10 further comprises a timing network 526, a synch gate 528, and a video gate 530. Timing network 526 received an input signal from video and audio detector 510 and generates gating signals to synch gate 528 and video gate 530. Video gate 530 is coupled between video comparator 522 and synch and inversion control 520 whereas synch gate 528 is coupled between synch comparator 524 and synch and inversion control 520. Timing network 526 operates, as will be explained below, to pass the output of video comparator 522 through video gate 530 during a selected trace line of vertical intervals of a video signal. As will also be explained below, timing network 526 operates to pass the output of synch comparator 524 through synch gate 528 during an initial portion of horizontal blanking pulses during the fields of the video signal.

Further in accordance with the present invention, the decoder includes control means for normally coupling the first control signal to the biasing means, the control means being responsive to detection by the first means of the selected trace line of a vertical interval having an inverted polarity to couple the second control signal to the biasing means during the line traces of an associate field following the vertical interval, and the control means being responsive to detection by the second means of the initial portion of horizontal blanking pulses having an amplitude below a predetermined level to couple the third control signal to the biasing means during the portion of the horizontal blanking pulse following the initial portion.

As will be explained below with respect to the specific example of the decoder generally illustrated in FIG. 10, synch and inversion control 520 operates to normally generate a first control signal which operates to establish a first differential signal biasing first and second terminals 516 and 518 of video and audio modulator 514 sufficiently for modulator 514 to generate a normal modulated television signal from the video signal on line 512. In addition, it will be explained below how synch and inversion control 520 generates a second control signal upon the detection by video comparator 522, in conjunction with video gate 530 and timing network 526, of a selected trace line of a vertical interval having an inverted polarity and in response to the second control signal generates a second differential signal biasing first and second terminals 516 and 518 the same as upon generation of the first control signal but with the video and reference level signals interchanged at input terminals 516 and 518, whereby modulator 514 generates an inverted modulated television signal to television receiver 532.

Finally, as will be explained below, synch and inversion control 520 is responsive to detection by synch comparator 524 and synch gate 528 of an initial portion of a horizontal blanking pulse having an amplitude below a predetermined level to generate a third control signal which results in coupling of a third differential signal to first and second terminals 516 and 518 sufficiently for modulator 514 to generate a modulated television signal at a fixed video level above the normal video signal to thereby effectively re-establish the correct level of the suppressed horizontal blanking pulses for the period following the initial period.

It is also preferred that the decoder of the present invention include means for detecting a received audio subcarrier signal, means for demodulating said subcarrier signal to generate an audio signal in response to detecting said audio subcarrier signal, means for coupling said audio signal to said second input terminal of said modulator, and said modulator operable to generate a modulated television signal with audio.

In the specific example of the decoder illustrated in FIG. 10, audio output from video and audio detector 510 is provided, as is wellknown to those skilled in the art, on line 534. The audio on line 534 is coupled to audio switch 536, audio carrier decoder 538, and audio carrier detector 540. Audio carrier detector 540 may, for example, comprise a Decoder Number LM567CN, tuned by adjustment well-known to those skilled in the art to a 39 kHz audio subcarrier signal. Audio carrier detector 540 operates to generate a control signal to audio switch 536 upon detection of the audio subcarrier. Audio carrier decoder 538 operates to demodulate the audio subcarrier to provide demodulated audio to audio switch 536 which is passed through audio switch 536 upon operation of detector 540. However, upon failure of detector 540 to indicate the presence of an audio subcarrier, the audio signal on line 534 is passed directly through audio switch 536. The output of audio switch 536 is coupled to second input 518 of video and audio modulator 514.

In accordance with the present invention, the decoder further comprises means responsive to data signals appearing in the received composite video signal during selected trace lines of the vertical intervals to selectively enable or disable the modulator. The specific example of the decoder illustrated in FIG. 10 includes a data gate 542 shift register 544, address comparator 546, storage 548, and terminal on/off memory 550. The input of data gate 542 is coupled to the output of video comparator 522 whereas the output of data gate 542 is coupled to shift register 544. Data gate 542 is opened by operation of timing network 526 to pass the output from video comparator 522 during selected trace lines of vertical intervals of the video signal appearing on line 512. Data on these selected trace lines is sequentially loaded into shift register 544. As was explained above, the data may preferably take the form of 24 bits of digital information. The first two bits are frame bits, followed by 19 binary coded address bits. The next two bits are data bits which are used to enable or disable the decoder. The last bit is a parity bit which relates to odd parity of the 19 address bits only, not the frame bits or the data bits. Address data is preset into the decoder storage 548 and the preset address is compared against the received address in shift register 544 by address comparator 546. When the address preset into storage 548 matches the address which is loaded into shift register 544, the two data bits loaded into shift register 544 are examined by terminal on/off memory 550. If both data bits are low, the output of terminal on/off memory 550 enables video and audio modulator 514. However, if both data bits are high, the output of terminal on/off memory 550 disables video and audio modulator 514. No change is made in the previous setting of terminal on/off memory for any other combination.

The enable or disable signal from terminal on/off memory 550 is preferably accomplished by a pulse of approximately 1 millisecond duration to either set or reset terminals of a magnetic latching reed relay used in memory 550 to switch power to video and audio modulator 514. If the memory is commanded to the reset or disable state, voltage is removed from modulator 514 such that no signals, video or sound, scrambled or unscrambled, are delivered to television receiver 532. Since the relay is magnetically latching in either mode, as is the case for example with latching Reed Relay model number 961A12Y1L manufactured by the C. P. Clare Company, disconnecting power to the decoder in general, for either short or long periods, will not affect the setting of the relay and therefore will not affect the enable or disable setting of memory 550.

In operational practice, it is anticipated that all decoders will initially be set in the enable state before installation and that a disabling signal will be sent to the appropriate decoders on a rotationally continuing basis at least during the transmission of scrambled programs. Since only the power to the modulator 514 is affected by memory 550, address comparator 546 is operable at all times when there is power to the decoder. Thus, any unauthorized decoder attempting to receive scrambled programs can be disabled. Enabling of a decoder may occur any time thereafter, but typically will be done prior to scrambled program transmission.

In operation of the decoder illustrated in FIG. 10, audio and video signals appear on lines 534 and 512 from video and audio detector 510 upon receipt of a composite television signal at antenna 500. If the audio signal contains an audio subcarrier, audio subcarrier detector 540 operates to switch audio switch 536 such that the detected audio from decoder 538 is passed through audio switch 536 to second input terminal 518 of modulator 514. However, if an audio subcarrier is not detected, audio switch 536 operates to pass audio directly from video and audio detector 510 onto second input 518 of modulator 514.

The video signal on line 512 is coupled to first input 516 of video and audio modulator 514 through synch and inversion control 520 for normal operation. As will be explained below, synch and inversion control 520 normally sets a reference differential between terminals 516 and 518 such that modulator 514 generates a normal modulated television signal to receiver 532.

Video comparator 522 also receives video signal from line 512 and compares the magnitude of that video signal against the magnitude of an uninverted black signal. The output of video comparator 522 is gated by video gate 530 to pass to synch and inversion control 520 only during a selected trace line of vertical intervals. For example, the output of video comparator 522 may be passed to synch and inversion control 520 only during the last complete trace line of a vertical interval. If the magnitude of the video during such last complete trace line indicates an uninverted black level, synch and inversion control 520 will continue to maintain normal operation of modulator 514. However, if video comparator 522 detects that the last complete trace line of a vertical interval is below the uninverted black level, synch and inversion control 520 will operate to bias inputs 516 and 518 and interchange the video signal and reference level inputs such that the video signal appearing on line 512 is inverted by video and audio modulator 514 during the line traces of the subsequent field. In this manner, a randomly inverted video field is restored to normal without the necessity of employing control codes, keying signals, or other encoding signals independent from the actual inversion of the video signal. In the decoder of FIG. 10 it is the inversion of the video signal itself without additional encoding signals which is detected and utilized to reinvert randomly inverted selected fields.

Synch comparator 524 operates to continuously monitor the level of the video signal to determine when that level falls below the level of a standard horizontal blanking pulse. Synch gate 520 is operated to transmit the output of synch comparator 524 to synch and inversion control 520 during the initial or front porch period of each horizontal blanking pulse during a field. Upon detection of a subnormal initial period or front porch portion of a horizontal blanking pulse, synch and inversion control 520 immediately operates to rebias first and second inputs 516 and 518 to a level which assures that the remaining portion of the horizontal blanking pulse will be restored to normal level. Furthermore, a signal from synch and inversion control 520 is transmitted upon detection of a suppressed horizontal blanking pulse to automatic gain control 508 to rebias the automatic gain control in a manner which avoids adverse effect on the automatic gain control by the remaining portion of the suppressed horizontal blanking pulse. It is this rebiasing of automatic gain control 508 which allows timing network 526 to continually and accurately determine the expected location of the next horizontal blanking pulse.

Turning now to FIG. 11 there is disclosed illustrative but non-limiting examples of terminal on/off memory 550, video and audio modulator 514, and synch and inversion control 520.

In FIG. 11, an example of video and audio modulator 514 is shown to comprise a video modulator chip 600. As was explained above, video modulation chips 600 preferably comprises semiconductor chip LM1889N which is typically presently found in video games. Chip 600 has a first input 602 at pin 12 and a second input terminal 604 at pin 13.

First terminal 602 is coupled to a tap point of variable resistor 603 which is coupled between bias terminal 618 of memory 550 and ground. Second terminal 604 is coupled to receive audio through a circuit comprising resistors 606, 608, 610, and 611, inductor 612, capacitors 614 and 615, and varactor diode 616. Specifically, resistors 606 and 608 are coupled between terminal 618 of memory 550 and ground. The anode of diode 616 is coupled to the junction of resistors 606 and 608 while inductor 612 is coupled between bias terminal 618 and the cathode of diode 616. Both capacitor 614 and resistor 610 are coupled in parallel with inductor 616. The cathode of diode 616 is also coupled through the series combination of capacitor 615 and resistor 611 to input 604 of chip 600. The circuit comprising resistors 606, 608, and 610, inductor 612 capacitor 614, and varactor diode 616 operates to match audio which appears at the junction of resistors 606 and 608 to a standard television frequency of modulation for receipt at input terminal 604 of chip 600.

The output of chip 600 is coupled through a surface acoustic wave filter 620 which removes lower side bands of modulation from chip 600 as will be readily apparent to those skilled in the art. Filter 620 may, for example, comprise a monolithic crystal filter number CI155B from Crystal Technology, Inc. The output of filter 620 is transmitted to a standard television receiver.

Terminal on/off memory 550 is shown in FIG. 11 as comprising transistors 622 and 624, voltage regulator 626, and a latching relay 628 which comprises coils 630 and 632 and switch 634. Voltage regulator 626 and switch 634 are coupled in series between a source of D.C. voltage and terminal 618. Coil 630 is coupled in series with the emitter-collector path of transistor 622 between the D.C. source and ground while coil 632 and the emitter-collector path of transistor 624 are coupled in series between the D.C. source and ground. The base of transistor 622 is coupled to receive a disable signal from address comparator 546 whereas the base of transistor 624 is coupled to receive an enable signal from address comparator 546 of FIG. 10. Thus, upon receipt of a disable signal transistor 622 temporarily conducts causing opening of switch 634 and removal of any power to terminal 618. On the other hand receipt of an enable signal at the base of transistor 624 closes switch 634 and provides for power at terminal 518 through voltage regulator 626.

Synch and inversion control 520 is illustrated in FIG. 11 as comprising an analog switch 636 having normally open first, second, third, and fourth internal switches 638, 640, 642 and 644.

Switch 638 is coupled in series with resistor 645 between a pick-off point of resistor 646 and second input terminal 604 of chip 600. Switch 640 is coupled between video line 512 and first input terminal 602 of chip 600. Switch 642 is coupled in series with resistor 645 between video line 512 and input terminal 604. One side of switch 644 is coupled to ground through variable resistor 656 while the other side of switch 644 is coupled to a bias point in automatic gate control 508. Resistors 646 and 649 are series-coupled between terminal 618 of memory 550 and ground and the junction of resistors 646 and 649 is coupled through resistor 645 to second input terminal 604.

The operation of switch 640 is governed by receipt of a first control signal on line 650, the operation of switch 642 is governed by a second control signal on line 652, and the operation of switches 638 and 644 is governed by a third control signal appearing on line 654. Analog switch 636 may, for example, comprise semiconductor chip number 4066B.

Upon receipt of a first control signal on line 650, switch 640 is closed providing input 602 of video modulation chip 600 with a video signal from line 512 while input 604 is provided with a bias determined by the voltage drop across resistor 649. This bias is selected to result in a normal modulated television signal generated by chip 600 responsive to the video signal appearing at terminal 602 and the audio signal appearing at 604.

However, upon receipt of a second control signal on line 652 which closes switch 642, switch 640 is opened and the video from line SR is applied to second terminal 604 of chip 600 and terminal 602 is provided a bias determined by the setting of the pick-off point of resistor 603 which creates a reference differential between input 602 and 604 which is equal in magnitude and opposite in polarity to the differential created upon receipt of the first control signal on line 650. This new bias and change of video input on pins 602 and 604 results in a modulated television signal at the output of chip 600 in which the video portion is inverted.

Upon receipt of a third control signal on line 654, switches 638 and 644 are closed, switch 642 is opened and switch 640 is closed. Closure of switch 638 causes a bias to appear at pin 604 equal to the voltage drop across a portion of resistor 646 and across the whole of resistor 649. This bias results in an increase in the level of the video portion of the modulated television signal generated by chip 600 which increase is designed by setting a variable resistor 649 to precisely offset the amount of suppression introduced by the encoder to randomly selected horizontal blanking pulses. In addition, upon receipt of the third control signal on line 654, closure of switch 644 generates a bias signal from resistor 656 to automatic gain control 508. Thus, if the third control signal is received on line 654 during the initial or front porch portion of a suppressed horizontal synchronization pulse, the signal to automatic gain control 508 from resistor 656 will assure that the automatic gain control will rebias the suppressed horizontal blanking pulse to a normal blanking pulse level thereby allowing for normal operation of the automatic gain control.

Generation of first, second and third control signals on lines 650, 652 and 654 is achieved by operation of inverter 660, NAND Gate 664, and NOR gates 666, 668, 672, and 674. Inverter 660 is coupled to receive horizontal flyback pulses from timing network 526 of FIG. 10, one input of NOR gate 666 is designed to receive a synch compare signal from synch gate 528 of FIG. 10, one input of NAND gate 664 is designed to receive a vertical interval signal from timing network 526 of FIG. 10, and the other input of NAND 664 is designed to receive a video compare signal from video gate 530 of FIG. 10. The output of inverter 660 is coupled to a second input of NOR gate 666, and to both inputs of NOR gate 668. The output of NAND gate 664 is coupled to the first input of NOR gate 672. The output of NOR gate 668 is coupled to a second input of NOR gate 672. The output of NOR gate 672 is coupled to both inputs of NOR gate 674.

As will be explained in detail below, the horizontal flyback pulses delivered to the input of inverter 660 go positive slightly after the initiation of each horizontal blanking pulse of a field and remain positive for the duration of each horizontal blanking pulse. The vertical interval signal appearing at the first input of NAND gate 664 is low during each vertical interval. In addition, a synch compare signal is defined as a signal which begins during the inital portion or front porch portion of each suppressed horizontal blanking pulse and continues for the duration of each such pulse. A video compare signal is defined as a signal which goes positive during a selected trace line of each vertical interval wherein the trace line is inverted in polarity and remains positive for the duration of the succeeding field.

In accordance with standard logic, a first control signal from the output of NOR gate 674 is normally present on line 650. A second control signal from the output of NOR gate 672 appears during trace lines of a field following a vertical interval in which the selected line trace exhibits a reverse polarity. A third control signal appears from the output of NOR gate 666 following the initial or front porch period of each suppressed horizontal synchronization pulse and continues for the duration of each such pulse. Synch and inversion control 520 therefore operates to reestablish the correct polarity of randomly inverted video signals and the correct biasing of randomly selected suppressed horizontal blanking pulses and achieves this end without the employment of any control codes, keying signals, or encoding signals independent of the actual scrambled video signal itself.

Turning to FIG. 12 there is disclosed a circuit diagram of one example of synch comparator 524, video comparator 522, synch gate 528, and video gate 530. In FIG. 12, synch comparator 524 is shown to comprise resistors 700 and 702 and differential amplifier 704. Resistors 700 and 702 are series-connected between a positive supply of voltage and ground and their junction point is coupled to the positive input of differential amplifier 704. The negative input of differential amplifier 704 is provided with a video signal from line 512 of FIG. 10. The bias provided by resistor 700 and 702 is preferably set just above the black level, typically at approximately $3\frac{1}{2}$ volts. Accordingly, when a suppressed horizontal blanking pulse appears at the negative terminal of amplifier 704, a negative signal is generated at the output whereas, if a normal pedestal is received, a positive signal is generated at the output of the amplifier 704.

The output of amplifier 704 is coupled to synch gate 528 which in FIG. 12 is illustrated as comprising a flip-flop 706. Specifically, the output of amplifier 704 is coupled to the data input of flip-flop 706. The clock input of flip-flop 706 is coupled to receive horizontal flyback pulses from timing network 526 and the set terminal of flip-flop 706 is coupled to receive a vertical interval signal from timing network 526. If a negative output is received from amplifier 704 at the beginning of a horizontal flyback pulse indicating existence of a suppressed amplitude horizontal blanking pulse, a low synch compare signal is generated at the Q output of flip-flop 706. However, in the event of a normal amplitude horizontal blanking pulse being received at the beginning of a horizontal flyback pulse and at all times during the vertical interval, the Q output of flip-flop 706 remains high.

Video comparator 522 is illustrated in FIG. 12 as comprising resistors 708 and 710 and differential amplifier 712. Resistors 708 and 710 are coupled in series between a positive source of D.C. voltage and ground. The junction of resistors 708 and 710 is coupled to the positive input of differential amplifier 712. The negative input of amplifier 712 is coupled to receive video from line 512 of FIG. 10. The bias provided by resistors 708 and 710 is preferably set at approximately half way between black and white level in a video signal or approximately $37\frac{1}{2}\%$ amplitude. Typically, this level may be in the order of $5\frac{1}{4}$ volts. When the video is black or approximately 3 volts, the comparison is positive and a positive output is generated from amplifier 712. However, when the video is white the comparison in negative and a negative output is generated by amplifier 702.

The output of amplifier 712 is coupled to video gate 530 which, in FIG. 12, is illustratively shown to comprise inverter 714, counter 718, AND gate 720, and flip-flop 722. The output of amplifier 712 is coupled through inverter 714 to one input of AND gate 720. Horizontal drive pulses are defined as with respect to timing network 526 a square wave locked to the horizontal synch rate slightly after the beginning of each horizontal blanking pulse. These horizontal drive pulses are coupled from timing network 526 to the input of counter 718. The reset of counter 718 is coupled to a vertical blanking synch signal from timing network 526 which is defined as a signal which goes negative half-way through a vertical synchronization pulse and goes positive at the termination of the vertical interval. Counter 718 is therefore enabled half way through each vertical synchronization pulse and is designed to count horizontal drive pulses until a selected trace line of the vertical interval is reached. Preferably the selected trace line is the last complete trace line of each vertical interval.

The output of counter 718 is coupled to a second input of AND gate 720. The output of AND gate 720 is coupled to the clock terminal of flip-flop 722. AND gate 720 accordingly provides to the clock terminal of flip-flop 722 a positive going signal during the selected trace line of a vertical interval whenever a selected trace line is inverted.

The data terminal of flip-flop 722 is coupled to a constant positive signal source. The reset of flip-flop 722 is coupled to receive end of field pulses from timing network 526 which end of field pulses are designed to occur at the end of each field of the video signal. Since counter 718 can provide a positive input to the AND gate 720 only during the selected line trace of each vertical interval, flip-flop 722 provides a positive going video compare signal at output terminal Q only when the selected video line trace of a vertical interval is inverted. The video compare signal, as a result of end of field pulses supplied to the reset terminal of flip-flop 722, continues throughout the subsequent field.

In FIG. 13 there is illustrated a circuit diagram of one example of timing network 526. This example of timing network 526 is essentially the same as the example of timing network 116 illustrated in FIG. 9 above. Specifically, timing network 526, as illustrated in FIG. 13, is provided with a video signal on line 800 from antenna 802. The video signal on line 800 is shown coupled to tuner and master oscillator 804. Tuner and master oscillator 804 is known to those skilled in the art as having a standard TV tuner and an internal oscillator which is locked to the horizontal synchronization signals of the received video signal. Specifically, master oscillator 804 may comprise a M1 Module of Zenith Corporation which, as was explained above, employs a 503.5 kHz master scan oscillator which is phased-locked to 32 times the horizontal rate of a video signal received by a tuner section. The output of master scan oscillator 804 includes an audio signal suitable for use on line 534 of FIG. 10 and a video signal suitable for use on line 512 of FIG. 10 as is well-known to those skilled in the art. A master clock output of oscillator 804 is coupled by line 806 to synch signal generator 808. When master oscillator 804 is an M1 Module, line 806 is coupled to terminal B4.

Synch signal generator 808, as is well-known to those skilled in the art, provides horizontal drive pulses and verticle blanking synchronization pulses in response to receipt of a master clock signal and a composition synchronization signal. Synch signal generator 804 may, as was explained above, comprise a Zenith 221-103 chip. A composite synchronization signal is provided to synch signal generator 808 from line 810 coupled to master oscillator 804. A composite synchronization signal as explained above merely comprises the horizontal and vertical synchronization signals from the video signal on line 800. For example, a suitable composite synchronization signal can be received from terminal B2 of a Zenith M1 Module as would be perfectly apparent to one skilled in this art.

The timing network illustrated in FIG. 13 further comprises an inverter 812 which corresponds to inverter 410 of FIG. 9, a counter 814 which corresponds to counter 412 of FIG. 9, a flip-flop 816 which corresponds to flip-flop 408 of FIG. 9, an inverter 818 which corresponds to inverter 414 of FIG. 9, an integrating network 820 which corresponds to integrating network 418 of FIG. 9, a differential amplifier 822 which corresponds to differential amplifier 420 of FIG. 9, flip-flops 824 and 826 which correspond to flip-flops 422 and 424 of FIG. 9, and a counter 828 which corresponds to counter 426 of FIG. 9.

Each of the above-identified elements of the timing network of FIG. 13 is connected in the same manner as the corresponding element of the timing network in FIG. 9. The primary difference between these elements resides in the fact that counter 814 of FIG. 13 is reset to provide an output upon receipt of only five master clock signals to reset flip-flop 816 as opposed to the six master clock signals employed in counter 412 to reset flip-flop 408. As a result of employing only five master clock signals, the Q output of flip-flop 816, namely flyback pulses, is centered on horizontal synchronization signals of the video signal and has a duration of only five of the 32 oscillations of master oscillator 804 which occur for each video line. Accordingly, the flyback pulses from flip-flop 816 begin just slightly after the beginning of each horizontal blanking pulse and terminate slightly before the termination of each horizontal blanking pulse. Thus, the horizontal flyback pulses from flip-flop 816 can be employed, as discussed with respect to FIG. 12, to assure comparison of the level of each horizontal blanking pulse slightly after the beginning of each horizontal blanking pusle, for example, during the front porch of each horizontal blanking pulse.

The additional outputs of timing network 526 illustrated in FIG. 13 include horizontal drive pulses from synch signal generator 808, vertical blanking synch pulses from synch signal generator 808, end of field pulses from counter 828, and vertical interval signals from the $\overline{Q}$ output of flip-flop 826. The horizontal drive pulses from synch signal generator 808 are defined with respect to timing network 526 as a square wave locked to the horizontal synchronization rate which, because of counter 814 being set to only 5 rather than 6 master clock counts, passes from negative to positive at or slightly after the beginning of each horizontal blanking pulse. The vertical blanking synchronization pulses from synch signal generator 808 are defined with respect to timing network 526 the same as with respect to timing network 116, namely as a signal which is negative going half-way through the vertical synchronization pulse of a video signal and remains negative until termination of the vertical interval signal. The vertical interval signals from flip-flop 826 are the same as the vertical interval signals from flip-flop 424 FIG. 9, namely, they are signals which are high during the vertical interval and low during the fields between vertical intervals. Finally, the end of field pulses from the output of counter 828, like counter 426 of FIG. 9, are designed to provide a short end of field pulse at the start of each vertical interval.

The horizontal drive pulses, horizontal flyback pulses, vertical interval signals, end of field pulses, and vertical blanking synch pulses from timing network of 526 of FIG. 13 are coupled to synch gate 528 and video gate 530 as illustrated in FIG. 12 and operate as explained above. Furthermore, the horizontal flyback pulses and vertical interval signals from timing network 526 illustrated in FIG. 13 are coupled to synch and inversion control 520 as illustrated in FIG. 11 and operate as explained above.

The above-described subscription system is uniquely suitable for use with a standard television transmitter for several reasons. First, no transmitter power reduction is required since the picture video is transmitted at exactly the same level as in normal NTSC transmissions, the only difference being that the actual video is sometimes reversed to provide the equivalent of a negative image, and some horizontal blanking pulses are suppressed preferably approximately 6 db. Second, no change whatsoever is required or desirable in the setting of predistortion circuits of a transmitter over that used for standard NTSC transmission. Even during horizontal blanking pulse suppression, the pulse is being transmitted in the predistorted and linearized portion of the transmitter characteristic. Accordingly, only one exciter tuned for standard NTSC transmission is required. All the modifications to the signal are done in the video domain and consist of simply a blanking pulse offset and a signal inversion on a controlled basis. No gain change is introduced into the transmission system at any time. Even the blanking pulse suppression is accomplished with a simple bias level offset, as opposed to gain change, thereby preserving the transmitted fidelity and linearity of the pulse.

In the decoder, the signal is restored to its original state, before modulation onto an output carrier by a series of switching controlled bias changes at a modulator. The decoder simply follows the random suppression format by sampling each horizontal blanking pulse during the "front porch" in order to determine its level. If it is below blanking level, the decoder automatically switches in the correct bias level to bring the pulse back to its original state. Conversely, if the pulse is at a blanking level, it is deemed normal and no change is required.

Video inversion is accomplished on a random field by field basis. The decoder simply samples a particular line in the vertical interval of each field to determine whether that line is at the black or white level. If that line is at the white level, the decoder assumes video inversion from the subsequent field and will invert each active video portion of every line of the following field. Conversely, if the line is at the black level, normal video is assumed and no inversion is required. Thus, the decoder may be said to be format agile in that it changes to suit whatever format is transmitted.

It should be noted that the starting point and reference for the decoder is the vertical interval in each field wherein initial synchronization and timing are established since the format during this interval is always known. Another important feature of the described system is that, since the decoder is format agile, no signal is required to switch the video from scrambled to standard NTSC broadcast. However, since it is desirable to switch the sound, the presence of the audio subcarrier signal will cause the sound to switch from normal base-band audio to subcarrier audio during scrambled transmission, and can also be used to switch the video scrambling circuits.

Even though it is possible to alter the video inversion and synchronization suppression formats at random and at any order, in practice, standard non-inverted video preferably will not be sent unless synchronization suppression is in effect. This assures that one form of scrambling is present at all times.

The suggested rate of change for video inversion is approximately 3 consecutive but randomly chosen fields of standard or non-inverted video out of every 100 fields. The rate of change for suppressed synchronization should be approximately one field of non-suppressed synchronization, randomly chosen (but never corresponding to a field of non-inverted video) out of every 60 fields of suppressed synchronization. No two fields of unsuppressed synchronization should be consecutive. The preferred operational combination will tend to give the scrambled picture a flashing effect which is quite annoying. It will also tend to produce the same interruption of the picture for unauthorized or "bootleg decoders" which are not quite sophisticated enough to handle the full format agility required in the subject system. The two interacting forms of scrambling plus the random variations produce a very effective form of scrambling and produce a high degree of security.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or scope of applicant's general inventive concept.

I claim:

1. A subscriber television system for selectively communicating a composite video signal having fields with horizontal trace lines separated by horizontal blanking pulses having front porches followed by horizontal synchronization pulses and the video signal further having vertical intervals separating the fields, the vertical intervals containing vertical synchronization information followed by horizontal trace lines separated by horizontal blanking pulses, the system comprising:
    (a) video encoder means for randomly inverting the polarity of said video signal by inverting the polarity of a trace line of randomly selected vertical intervals, and by inverting the trace lines of associated fields following said randomly selected vertical intervals, said encoder means further including means for suppressing the amplitude of randomly selected horizontal synchronization and blanking pulses during fields of said video signal to form a scrambled video signal;
    (b) detector means responsive to the polarity of said trace line of said vertical intervals for detecting the polarity of the trace lines of said associated fields, said detector means being further responsive to the amplitude of said scrambled video signal having less than a first amplitude signal during selected time intervals of said horizontal blanking pulses for detecting the suppression of said randomly selected horizontal synchronization pulses, and
    (c) decoder means responsive to said detector means for unscrambling said scrambled video signal, said decoder means including means for activating a switch for biasing said video signal with a second predetermined amplitude signal for a selected time interval following said detecting by said detector means of suppression of a horizontal synchronization pulse.

2. The system of claim 1 wherein said selected time intervals comprise time intervals of said front porches of said horizontal blanking pulses.

3. The system of claim 1 wherein said trace line of, vertical intervals comprises the last complete trace line in said vertical intervals.

4. The system of claim 1 wherein said first amplitude signal represents a level less than the amplitude of unsuppressed horizontal blanking pulses.

5. The system of claim 1 wherein said encoder includes means for generating an audio subcarrier signal, means for generating an audio signal, and means for modulating said audio subcarrier signal with said audio signal, and said decoder means includes means for detecting said audio subcarrier signal and for demodulating said subcarrier signal in response to detecting said audio subcarrier signal.

6. The system of claim 1 wherein said encoder includes means for inserting data signals into additional selected trace lines of said vertical intervals and said decoder means includes means responsive to said data signals to selectively enable or disable said decoder means.

7. A television signal decoder for unscrambling a composite video signal having a horizontal trace line of randomly selected vertical intervals inverted and having the trace lines of associated fields following said vertical intervals inverted and further having randomly selected horizontal synchronization and blanking pulses during fields of the video signal suppressed in amplitude, the decoder comprising:
    (a) first means for detecting the polarity of said trace line of vertical intervals of a video signal;
    (b) second means for detecting the amplitude of said video signal during horizontal blanking pulses;
    (c) third means responsive to detection by said first means of said trace line having an inverted polarity for inverting the polarity of said associated fields; and
    (d) fourth means responsive to detection by said second means of said video signal having less than a first amplitude for activating a switch means for biasing said video signal with a second predetermined amplitude signal for a selected time interval following said detecting by said second means.

8. The decoder of claim 7 wherein said selected trace line is the last complete trace line of said vertical intervals, said last complete trace line normally having a black level amplitude and said inverted polarity, being indicated by said last complete trace line having a white level amplitude.

9. The decoder of claim 7 wherein said second means for detecting detects said amplitude of said video signal during the front porch of each horizontal blanking pulse and said selected time intervals comprise the duration of each said horizontal blanking pulse following said detection by said second means for detection.

10. The decoder of claim 7 further including means responsive to a data signal during additional trace lines of said vertical interval for activating or deactivating said decoder.

11. A television signal decoder for unscrambling a composite video signal having a horizontal trace line of randomly selected vertical intervals inverted and having the trace lines of associated fields following said vertical intervals inverted and further having randomly selected horizontal blanking and synchronization pulses during fields of the video signal suppressed in amplitude, the decoder comprising:
    a detector generating a video signal from said received composite video signal;
    a video modulator, said modulator having a first input terminal for said video signal and a second input terminal for a reference level signal, said modulator operable to generate a modulated television signal responsive to the difference between said video and reference level signals at said first and second terminals;
    biasing means for establishing first, second, and third differential signals between said first and second terminals upon receipt of first, second, and third control signals, respectively, said differential signals comprising the difference between said video and reference level signals, said first differential signal biasing said first and second terminals sufficiently for said modulator to generate a normal modulated television signal from said video signal, said second differential signal biasing said first and second terminals sufficiently for said modulator to generate an inverted modulated television signal, and said third differential signal biasing said first and second terminals sufficiently for said modulator to generate a modulated television signal at a fixed level from said normal modulated signal;

first means for detecting the polarity of a selected trace line of vertical intervals of said video signal;

second means for detecting the amplitude of said video signal during the initial portion of horizontal blanking pulses during the fields of said video signal; and control means for normally coupling said first control signal to said biasing means, said control means being responsive to detection by said first means of said selected trace line of a vertical interval having an inverted polarity to couple said second control signal to said biasing means during the trace lines of an associated field following said vertical interval, and said control means being responsive to detection by said second means of the initial portion of horizontal blanking pulses having an amplitude below a predetermined level to couple said third control signal to said biasing means during the portion of said horizontal blanking pulses following said initial portion.

12. The decoder of claim 11 further including means for detecting a received audio subcarrier signal, means for demodulating said subcarrier signal to generate an audio signal in response to detecting said audio subcarrier signal, means for coupling said audio signal to said second input terminal of said modulator; and said modulator operable to generate a modulated television signal with audio.

13. The decoder of claim 11 further comprising means responsive to data signals appearing in said received composite video signal during selected trace lines of said vertical intervals to selectively enable or disable said modulator.

14. The decoder of claim 11 wherein said detector includes means for identifying horizontal synchronization pulses in said received composite video signal, said detector including a master scan oscillator phase-locked to said horizontal blanking pulses in response to said horizontal synchronization pulses, said master scan oscillator being coupled to said second means for detecting to identify said initial portion of said horizontal blanking pulses and said biasing means further including means coupled to said detector to bias said means for identifying horizontal synchronization pulses during said portion of said horizontal blanking pulse following said initial portion in response to said third control signal to thereby prevent misoperation of said means for identifying during receipt of suppressed horizontal blanking pulses.

15. A method for establishing a subscriber television system comprising the steps of:
(a) generating a video signal comprising fields having video sections and synchronization sections and associated vertical intervals having video sections and synchronization sections;
(b) randomly inverting said video signal by inverting randomly selected fields and a portion of the video section of said vertical intervals associated with said randomly selected fields;
(c) suppressing the amplitude of randomly selected horizontal blanking pulses in said synchronization sections of said fields;
(d) transmitting a scrambled video signal formed by said steps of generating, inverting and suppressing;
(e) receiving said scrambled video signal;
(f) reinverting the polarity of the fields of said received scrambled video signal upon determining that the polarity of said portion of the video section of said associated vertical intervals is inverted;
(g) determining the amplitude of the horizontal blanking pulses of said received scrambled video signal and, upon determining that said video signal during the beginning of a horizontal blanking pulse is below a predetermined amplitude, activating a switch to bias the remaining portion of each horizontal blanking pulse in said fields with a fixed amplitude signal; and
(h) transmitting an unscrambled video signal formed by said steps of receiving, reinverting, determining and activating to a television receiver.

16. A method for decoding a scrambled video signal, which video signal has randomly selected fields and a portion of the video section of a vertical interval associated with said randomly selected fields inverted and which video signal further has randomly selected horizontal blanking pulses suppressed, said method comprising the steps of:
(a) detecting the polarity of said portion of the video section of each vertical interval;
(b) reinverting the polarity of fields of said scrambled video signal upon detecting that the polarity of said portion of the video section of said associated vertical interval is inverted;
(c) detecting the amplitude of the scrambled video signal during the initial portion of each horizontal blanking pulse in said fields; and
(d) activating a switch to bias the amplitude of the scrambled video signal with a predetermined amplitude signal during the portion of each horizontal blanking pulse in said fields following said initial portion for each pulse for which said step of detecting the amplitude reveals the amplitude as being below a predetermined level.

17. A subscriber television system for selectively communicating a composite video signal having fields with horizontal trace lines separated by horizontal blanking pulses having front porches followed by horizontal synchronization pulses and the video signal further having vertical intervals separating the fields, the vertical intervals containing vertical synchronization information followed by horizontal trace lines separated by horizontal blanking pulses, the system comprising:
(a) video encoder means for randomly inverting the polarity of said video signal by inverting the polarity of a trace line of randomly selected vertical intervals, and by inverting the trace lines of associated fields following said randomly selected vertical intervals, said encoder means further including means for suppressing the amplitude of randomly selected horizontal blanking pulses to form a scrambled video signal;
(b) detector means responsive to the polarity of said trace line of said vertical intervals for detecting the polarity of the trace lines of said associated fields, said detector means being further responsive to the amplitude of said scrambled video signal during horizontal blanking pulses for detecting the suppression of said randomly selected horizontal blanking pulses;
(c) means for identifying horizontal synchronization pulses in a received composite video signal, said means for identifying including a master scan oscillator phase-locked to said horizontal blanking pulses in response to horizontal synchronization pulses to identify an initial portion of said horizontal blanking pulses; and (d) decoder means responsive to said detector means for unscrambling said scrambled video signal, said decoder means including means coupled to said means for identifying horizontal synchronization pulses during said portion of said horizontal blanking pulse following said initial portion in response to said detection by said detector means of a suppressed horizontal blanking pulse to thereby prevent misoperation of said means for identifying during receipt of suppressed horizontal blanking pulses.

18. The system of claim 17 wherein said means for identifying horizontal synchronization pulses includes an automatic gain control coupled to said master scan oscillator, said automatic gain control being biased upon detection of an initial portion of a suppressed horizontal blanking pulse to prevent misoperation of said means for identifying during receipt of suppressed horizontal blanking pulses.

* * * * *